(12) United States Patent
Namiki et al.

(10) Patent No.: US 8,785,565 B2
(45) Date of Patent: Jul. 22, 2014

(54) PRODUCTION METHOD OF POLYCARBONATE, AND POLYCARBONATE PELLET

(71) Applicant: Mitsubishi Chemical Corporation, Chiyoda-ku (JP)

(72) Inventors: Shingo Namiki, Fukuoka (JP); Yasuhiro Oda, Fukuoka (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 14/041,489

(22) Filed: Sep. 30, 2013

(65) Prior Publication Data

US 2014/0031513 A1  Jan. 30, 2014

Related U.S. Application Data

(63) Continuation of application No. PCT/JP2012/058739, filed on Mar. 30, 2012.

(30) Foreign Application Priority Data

Mar. 31, 2011  (JP) ................................. 2011-079931

(51) Int. Cl.
*C08G 64/00* (2006.01)
*C08G 75/00* (2006.01)

(52) U.S. Cl.
USPC .............................. 525/370; 525/67; 528/371

(58) Field of Classification Search
USPC ........................................... 528/67, 370, 371
See application file for complete search history.

(56) References Cited

U.S. PATENT DOCUMENTS

| 8,445,624 | B2 | 5/2013 | Fuji et al. |
| 8,487,067 | B2 | 7/2013 | Namiki et al. |
| 2011/0034646 | A1 | 2/2011 | Fuji et al. |
| 2012/0232243 | A1 | 9/2012 | Namiki et al. |
| 2013/0296526 | A1 | 11/2013 | Namiki et al. |

FOREIGN PATENT DOCUMENTS

| JP | 2006-028441 | 2/2006 |
| JP | 2006-232897 | 9/2006 |
| JP | 2008-024919 | 2/2008 |
| JP | 2009-091404 | 4/2009 |
| JP | 2009-091417 | 4/2009 |
| JP | 2009-161745 | 7/2009 |
| WO | 2004/111106 | 12/2004 |
| WO | 2009/075305 | 6/2009 |

OTHER PUBLICATIONS

International Search Report mailed Jun. 5, 2012 in PCT/JP2012/058739 filed Mar. 30, 2012.
U.S. Appl. No. 14/041,636, filed Sep. 30, 2013, Namiki, et al.
U.S. Appl. No. 14/042,102, filed Sep. 30, 2013, Namiki, et al.
U.S. Appl. No. 14/041,397, filed Sep. 30, 2013, Yokogi, et al.

*Primary Examiner* — Terressa Boykin
(74) *Attorney, Agent, or Firm* — Oblon, Spivak, McClelland, Maier & Neustadt, L.L.P.

(57) ABSTRACT

The present invention relates to a method for producing a polycarbonate having excellent characteristics such as hue and mechanical properties with a stable quality and a high yield by solving a plurality of problems as those described above in producing a polycarbonate by using a specific dihydroxy compound exhibiting low thermal stability as compared with bisphenols and having a —$CH_2$—O— structure. The polycarbonate obtained by polycondensation in the present invention is a polycarbonate having an appropriate viscosity despite decrease in the reaction temperature, providing for a color tone less susceptible to yellowing, and exhibiting excellent mechanical properties.

20 Claims, 3 Drawing Sheets

PRODUCTION METHOD OF POLYCARBONATE, AND POLYCARBONATE PELLET

CROSS-REFERENCE TO RELATED APPLICATIONS

This application is a Continuation of PCT/JP2012/058739 filed on Mar. 30, 2012. This application is based upon and claims the benefit of priority to Japanese Application No. 2011-079931 filed on Mar. 31, 2011, the entirety of which is incorporated herein by reference.

BACKGROUND OF THE INVENTION

1. Technical Field

The present invention relates to a method for efficiently and stably producing a polycarbonate excellent in the transparency, hue, heat resistance, thermal stability, light resistance and mechanical strength and less contaminated with an extraneous matter.

2. Background Art

A polycarbonate is generally produced using bisphenols as a monomer ingredient and by making use of its superiority such as transparency, heat resistance and mechanical strength, is widely utilized as a so-called engineering plastic in the fields of electric•electronic parts, automotive parts, optical recording mediums, optics such as lens, and the like.

The conventional polycarbonate is produced using a raw material derived from petroleum resources, but in recent years, depletion of petroleum resources is feared, and it is demanded to provide a polycarbonate using a raw material obtained from biomass resources such as plant.

In addition, because of a concern that global warming due to increase or accumulation of carbon dioxide emissions may bring about climate change or the like, development of a polycarbonate using, as a raw material, a plant-derived monomer that is carbon neutral even when discarded after use is demanded.

Under these circumstances, a method for obtaining a polycarbonate by using, as a monomer ingredient, isosorbide (ISB) that is a dihydroxy compound obtained from biomass resources, and allowing transesterification with a carbonic acid diester to proceed while distilling of a byproduct monohydroxy compound under reduced pressure, has been proposed (see, for example, Patent Documents 1 to 6). The polycarbonate obtained from ISB has excellent optical characteristics and is known to be usefully usable as an optical material.

However, a dihydroxy compound such as isosorbide exhibits low thermal stability as compared with bisphenols and has a problem that coloration of a resin occurs due to thermal decomposition during a polycondensation reaction performed at a high temperature.

In order to solve such a problem, there have been proposed a method where the surface area of a reaction solution is gained by using a horizontal stirring reactor to raise the reaction efficiency and a polymerization reaction is thereby performed with less heat history (see, Patent Document 7).

BACKGROUND ART DOCUMENT

Patent Document

Patent Document 1: International Publication No. 04/111106
Patent Document 2: JP-A-2006-232897 (the term "JP-A" as used herein means an "unexamined published Japanese patent application")
Patent Document 3: JP-A-2006-28441
Patent Document 4: JP-A-2008-24919
Patent Document 5: JP-A-2009-91404
Patent Document 6: JP-A-2009-91417
Patent Document 7: JP-A-2009-161745

SUMMARY OF INVENTION

Problem that Invention is to Solve

However, studies by the present inventors have revealed a problem that when a horizontal stirring reactor is used, the reaction efficiency may be enhanced but, on the other hand, control of the reaction rate becomes difficult due to a too fast reaction and a resin having a molecular weight in a specific range cannot be stably produced and a problem that a low molecular ingredient remaining in the resin cannot be sufficiently reduced.

In addition, it has been also found that although decreasing the reaction temperature as much as possible is important so as to improve the color tone, if the reaction temperature is simply decreased too much, the flowability of a molten resin is reduced and the molten resin twines around a stirring shaft and does not run down, as a result, the molten resin can be hardly withdrawn at a constant flow rate from the reaction tank, giving rise to a problem of discontinuity of a pelletization process and reduction in the production yield.

Furthermore, there has been also found a problem that when pelletization is stopped in this way and an operation to again recover the pelletization is performed, even when the pelletization process is isolated to a clean room, the amount of extraneous matters temporarily contained in the resin is increased after the operation. Particularly, in use for an optical material, an extraneous matter can become a fatal defect of a product and this may lead to reduction in the yield at the stage of processing a resin or assembling a member.

An object of the present invention is to solve such a plurality of problems as those described above in producing a polycarbonate by using a specific dihydroxy compound exhibiting low thermal stability as compared with bisphenols used as a raw material in the conventional polycarbonate and having a —$CH_2$—O— structure and provide a method for producing a polycarbonate having excellent characteristics such as hue and mechanical properties with a stable quality and a high yield.

Means for Solving Problem

That is, the present invention is as follows.

[1] A method for producing a polycarbonate, comprising continuously feeding dihydroxy compounds containing a specific dihydroxy compound having a moiety represented by the following formula (1) in a part of the structure, a carbonic acid diester and a polymerization catalyst to a reactor and performing polycondensation to produce a polycarbonate, wherein as the reactor, a plurality of reactors are connected at least in series, the internal temperature of a penultimate reactor prior to a final polymerization reactor is from 200° C. to less than 230° C., and the melt viscosity of a reaction solution at the outlet of the penultimate reactor prior to the final polymerization reactor is from 100 to 1,000 Pa·s:

[Chem. 1]

$$\mathrm{-(-CH_2-O-)-} \qquad (1)$$

[with the proviso excluding the case where the moiety represented by formula (1) is a moiety constituting a part of —CH$_2$—OH].

[2] The method for producing a polycarbonate described in the above [1], wherein the melt viscosity of a reaction solution at the outlet of a penultimate reactor prior to the final polymerization reactor is from 140 to 1,000 Pa·s.

[3] The method for producing a polycarbonate described in the above [1] or [2], wherein the internal temperature of a penultimate reactor prior to the final polymerization reactor is from 200° C. to less than 225° C.

[4] The polycarbonate resin composition described in any one of the above [1] to [3], wherein assuming that the reduced viscosity of a reaction solution at the outlet of a penultimate reactor prior to the final polymerization reactor is P and the reduced viscosity of a reaction solution at the outlet of the final polymerization reactor is Q, the following formula (2) is satisfied:

$$1.5 \leq Q/P \leq 2.5 \quad (2)$$

[5] The polycarbonate resin composition described in any one of the above [1] to [4], wherein assuming that the amount of a double bond terminal structure in a reaction solution at the outlet of a penultimate reactor prior to the final polymerization reactor is X (mol/ton) and the amount of a double bond terminal structure in a reaction solution at the outlet of the final polymerization reactor is Y (mol/ton), the following formula (3) is satisfied:

$$Y-X \leq 6 \text{ and at the same time}, X \leq 5 \quad (3)$$

[6] The method for producing a polycarbonate described in any one of the above [1] to [5], wherein the final polymerization reactor is a horizontal stirring reactor having inside thereof a plurality of horizontal rotating shafts and the reaction conditions satisfy the following formula (4):

$$500 \leq \omega\mu \leq 20{,}000 \quad (4)$$

[ω: the rotation speed (rpm) of a stirring blade, and the melt viscosity (Pa·s) of a reaction solution at the outlet of the horizontal reactor].

[7] The method for producing a polycarbonate described in the above [6], wherein the reaction conditions of the horizontal stirring reactor satisfy the following formula (5):

$$2 \leq V/A \leq 9 \quad (5)$$

[V: the volume (L) of the horizontal reactor, and A: the throughput (kg/hr) of a reaction solution].

[8] The method for producing a polycarbonate described in any one of the above [1] to [7], wherein the melt viscosity of a reaction solution at the outlet of the final polymerization reactor is from 1,800 to 3,500 Pa·s.

[9] The method for producing a polycarbonate described in any one of the above [1] to [8], wherein the temperature of a heating medium of the final polymerization reactor is from 210 to 260° C.

[10] The method for producing a polycarbonate described in any one of the above [1] to [9], wherein the charge molar ratio of a carbonic acid diester to all dihydroxy compounds used for reaction when charged into a first reactor is from 0.990 to 1.030.

[11] The method for producing a polycarbonate described in any one of the above [1] to [10], wherein the amount of all hydroxy terminal groups in a reaction solution at the outlet of the final polymerization reactor is from 10 to 50 mol/ton.

[12] The method for producing a polycarbonate described in any one of the above [1] to [11], wherein the amount of a monohydroxy compound in a reaction solution at the outlet of a penultimate reactor prior to the final polymerization reactor is from 1,000 ppm to 3 wt % and the amount of a monohydroxy compound in a reaction solution at the outlet of the final polymerization reactor is from 1 to 700 ppm.

[13] The method for producing a polycarbonate described in any one of the above [1] to [12], wherein the pressure of the final polymerization reactor is from 10 Pa to 1 kPa.

[14] The method for producing a polycarbonate described in any one of the above [1] to [13], wherein the polymerization catalyst is a compound of at least one metal selected from the group consisting of metals belonging to Group 2 of the long-form periodic table and lithium.

[15] The method for producing a polycarbonate described in any one of the above [1] to [14], wherein the specific dihydroxy compound having a moiety represented by formula (1) is a compound having a cyclic ether structure.

[16] The method for producing a polycarbonate described in the above [15], wherein the specific dihydroxy compound having a moiety represented by formula (1) is a compound represented by the following structural formula (6):

[Chem. 2]

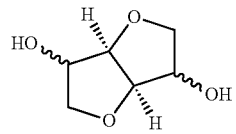

(6)

[17] The method for producing a polycarbonate described in any one of the above [1] to [16], comprising a step of filtering a polycarbonate obtained by polycondensation by feeding the polycarbonate in the molten state without being solidified to a filter.

[18] The method for producing a polycarbonate described in any one of the above [1] to [17], comprising a step of ejecting a polycarbonate obtained by polycondensation or a resin obtained by filtering the polycarbonate through a filter, into a strand from a die head and after cooling, pelletizing the strand by means of a cutter.

[19] A polycarbonate pellet produced by the production method claimed in claim 18.

[20] The polycarbonate pellet described in the above [19], wherein the number of extraneous matters of 20 μm or more is 1,000 pieces/m$^2$ or less.

Effects of Invention

The polycarbonate obtained by polycondensation in the present invention is a polycarbonate having an appropriate viscosity despite decrease in the reaction temperature, providing for a color tone less susceptible to yellowing, and exhibiting excellent mechanical properties. Accordingly, the polycarbonate can be used as a resin suitable for optical applications by removing an extraneous matter such as carbide through a filter from the polymer still in the molten state. The polycarbonate as a product includes a product obtained by ejecting the polymer into a strand from a die head and after cooling, pelletizing the strand by means of a cutter.

MODE FOR CARRYING OUT INVENTION

Figure 1:
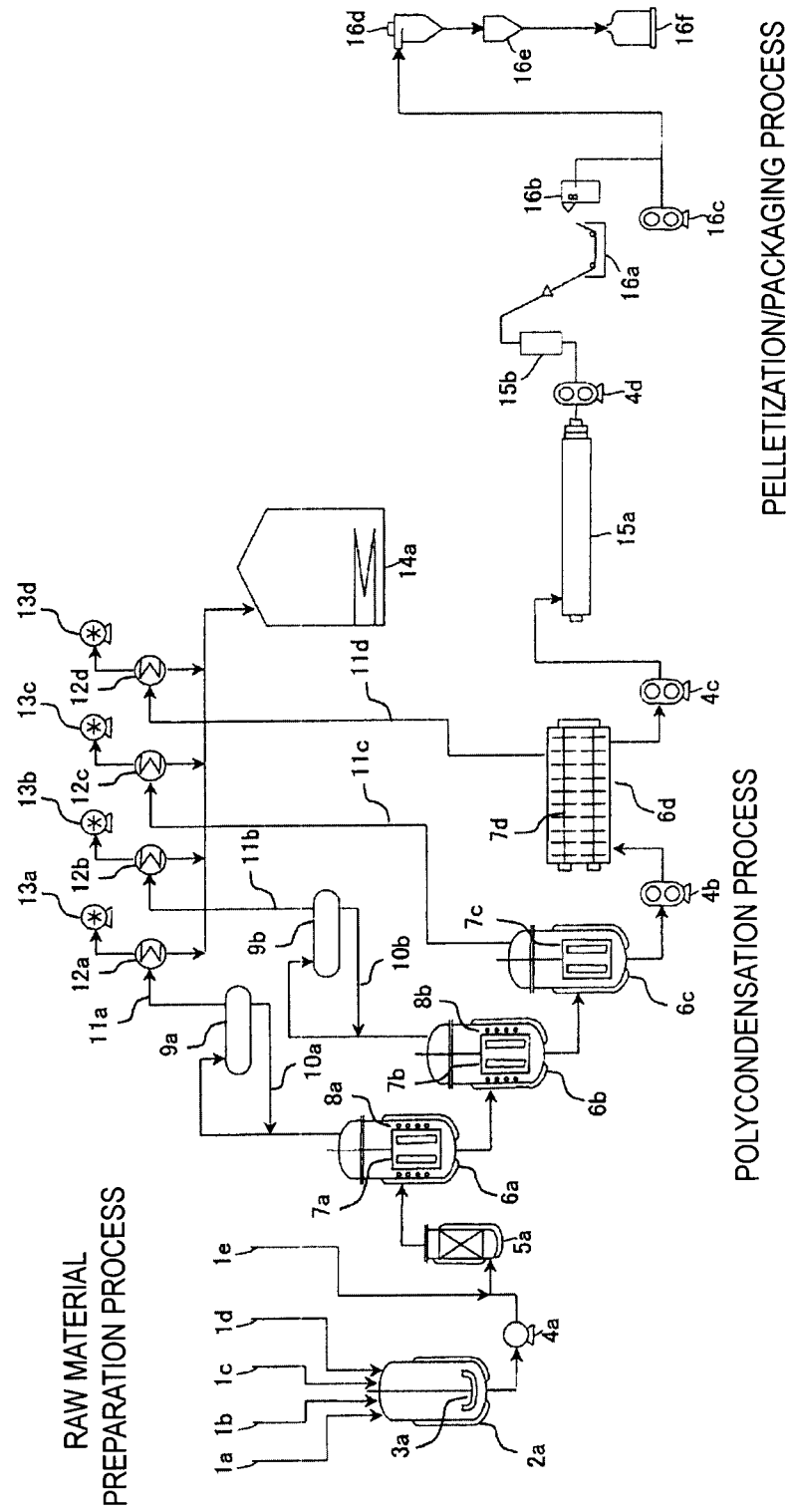
FIG. 1 is an entire process chart showing an example of the production method of a polycarbonate according to the present invention.

The mode for carrying out the present invention is described in detail below, but the constituent features described below are one example (representative example) of the embodiment of the present invention and as long as the gist of the invention is observed, the present invention is not limited to the following contents. Incidentally, the expression "(numerical or physical value) to (numerical or physical value)" as used in the description of the present invention is intended to include the numerical or physical values before and after "to".

The production method of a polycarbonate of the present invention is a method comprising continuously feeding dihydroxy compounds containing a specific dihydroxy compound having a moiety represented by the following formula (1) in a part of the structure, a carbonic acid diester and a polymerization catalyst to a reactor and performing polycondensation to produce a polycarbonate, wherein the reactor includes a plurality of reactors connected at least in series, the internal temperature of a penultimate reactor prior to a final polymerization reactor is from 200° C. to less than 230° C., and the melt viscosity of a reaction solution at the outlet of the penultimate reactor prior to the final polymerization reactor is from 100 to 1,000 Pa·s. Hereinafter, the production method of a polycarbonate of the present invention is sometimes referred to as "production method of the present invention".

[Chem. 3]

(1)

with the proviso excluding the case where the moiety represented by formula (1) is a moiety constituting a part of —CH$_2$—OH.

<Outline of Polycarbonate Production Process>

In the production method of the present invention, a polycarbonate is produced by reacting dihydroxy compounds containing the above-described specific dihydroxy compound and a carbonic acid in the presence of a polymerization catalyst (melt polycondensation) by a multistage process consisting of two or more stages by using at least two reactors.

In the following, the reactor of the first vessel, the reactor of the second vessel, the reactor of the third vessel, . . . are referred to as a first reactor, a second reactor, a third reactor . . . , respectively. Also, the second reactor is a reactor provided on the downstream side of the first reactor and is a reactor into which a reaction product of the first reactor next goes. Similarly, the third reactor is a reactor into which a reaction product of the second reactor next goes. Incidentally, in the case where reaction products of a plurality of reactors enter the same reactor, when a reactor is not present on the upstream side of each of the plurality of reactors, all of the plurality of reactors are regarded as a first reactor, and the reactor into which a reaction product of the first reactor next goes is a second reactor.

Furthermore, the "reactor" as used in the description of the present invention indicates an apparatus for intentionally causing a transesterification reaction in a step after mixing dihydroxy compounds and a carbonic acid diester, by having a heating device for heating the mixture to the later-described reaction temperature, and a dissolution tank aimed at mainly previously mixing or dissolving raw materials or a pipe for transferring a reaction solution does not come under the reactor even if a reaction may slightly proceed there.

Incidentally, the "final polymerization reactor" as used in the description of the present invention is a reactor provided most downstream, where the reduced viscosity of a reaction solution at the outlet of the reactor is 1.5 times or more the reduced viscosity of a reaction solution in a penultimate reactor prior to the final polymerization reactor. However, as long as the reduced viscosity satisfies the above-described condition, even an extruder or the like is regarded as the final polymerization reactor.

The polymerization process is divided into two stages of early-stage reaction and later-stage reaction. The early-stage reaction is performed at a temperature of preferably from 130 to 230° C., more preferably from 150 to 220° C., for preferably from 0.1 to 10 hours, more preferably from 0.5 to 3 hours, where a byproduct monohydroxy compound is distilled off and an oligomer is produced.

In the later-stage reaction, the pressure in the reaction system is gradually reduced from that in the early-stage reaction, the reaction temperature is also gradually raised, and by setting the reaction system to finally reach a pressure of preferably 2 kPa or less, a polycondensation reaction is preformed at a temperature of preferably from 200 to 260° C., more preferably from 210 to 250° C., while removing a concurrently occurring monohydroxy compound out of the system, whereby a polycarbonate is produced. Incidentally, the pressure as used in the description of the present invention indicates a so-called absolute pressure that is expressed on the basis of vacuum.

The reactor used in this polymerization process is, as described above, a reactor constructed by connecting at least two vessels, where a reaction product exited from the outlet of the first reactor enters the second reactor. The number of reactors connected is not particularly limited but is preferably from 2 to 7, more preferably from 3 to 5, still more preferably 3 or 4. The type of the reactor is also not particularly limited, but the reactor of the early-stage reaction preferably includes one or more vertical stirring reactors, and the reactor of the later-stage reaction preferably includes one or more horizontal stirring reactors.

In the production method of the present invention, the reaction conditions of the horizontal stirring reactor at the final stage can exert an important effect not only in view of the quality of the resin obtained but also from various aspects such as production yield or amount of an extraneous matter in the resin. In addition, the reactors are preferably set to stepwise raise the temperature and stepwise reduce the pressure as it progresses to later reactors not only between the early stage and the later stage but also among reactors in the early stage or among reactors in the later stage.

The reactor above may be connected to the next reactor directly only by a pipe or may be connected through a preheater or the like, if desired. The pipe preferably uses a double pipe system or the like, where the reaction solution can be transferred without causing cooling and solidification and neither a gas phase on the polymer side nor a dead space is produced.

The upper limit of the temperature of the heating medium for heating each of the reactors above is preferably 260° C., more preferably 250° C., still more preferably 240° C. If the temperature of the heating medium is too high, thermal deterioration on the reactor wall surface may be accelerated to cause a problem such as increase of a hetero structure or a decomposition product or worsening of the color tone. In particular, an unreacted dihydroxy compound is likely to produce a colored material by undergoing thermal decomposition and therefore, the temperature of the heating medium for a reactor prior to the final polymerization reactor is preferably less than 230° C. The lower limit of the temperature of the heating medium is not particularly limited as long as it is a temperature capable of maintaining the above-described reaction temperature.

The reactor for use in the present invention may be any known reactor. Examples thereof include a jacket-type reactor using a hot oil or a steam as the heating medium, and a reactor having a coiled heat-transfer tube in the inside thereof.

The reaction system of the production method according to the present invention is preferably a continuous system. As for the reactor, a plurality of vertical stirring reactors and at least one horizontal stirring reactor continuing therefrom are used. These reactors are arranged in series, and the processing is continuously performed.

After the polycondensation process, for example, a step of devolatilizing and removing a monohydroxy compound which is an unreacted raw material or a reaction byproduct in the polycarbonate, a step of adding a heat stabilizer, a release agent, a coloring material or the like, and a step of forming the obtained polycarbonate into a pellet having a predetermined particle diameter, may be appropriately added.

The monohydroxy compound such as phenol generated in the reactor above is collected in a tank and in view of effective utilization of resources, is preferably purified, if desired, recovered and then reutilized as a raw material of DPC, bisphenol A or the like. In the production method of the present invention, the method for purifying the byproduct monohydroxy compound is not particularly limited, but it is preferred to use a distillation method.

Respective processes in the production method according to the production method of the present invention are described below. The production method of the present invention is performed by mixing, as raw material monomers, dihydroxy compounds containing the specific dihydroxy compound having a moiety represented by formula (1), such as isosorbide (ISB), and a carbonic acid diester such as diphenyl carbonate (DPC), each in the molten state, to prepare a molten mixture of raw materials (raw material preparation process), and subjecting these compounds in the molten state to a multistage polycondensation reaction using a plurality of reactors in the presence of a polymerization catalyst (polycondensation process).

In the reaction above, a monohydroxy compound occurs as a byproduct and therefore, the reaction is allowed to proceed to produce a polycarbonate by removing the monohydroxy compound out of the reaction system. In the case of using DPC as the carbonic acid diester, the monohydroxy compound is phenol, and the reaction is allowed to proceed by removing the phenol under reduced pressure.

<Raw Material Preparation Process>

Dihydroxy compounds containing the specific dihydroxy compound having a moiety represented by formula (1) and a carboxylic acid diester, which are used as raw materials of a polycarbonate, are usually prepared as a molten mixture of raw materials by using a batch, semi-batch or continuous stirring tank-type apparatus in an atmosphere of an inert gas such as nitrogen or argon, or these raw materials are independently charged into a reaction tank.

For example, in the case of using ISB as the specific dihydroxy compound together with the later-described dihydroxy compound of an alicyclic hydrocarbon and using DPC as the carbonic acid diester, the melt-mixing temperature is selected in the range of preferably from 80 to 180° C., more preferably from 90 to 120° C.

An antioxidant may be also added to the molten mixture of raw materials. By adding a commonly known hindered phenol-based antioxidant and/or phosphorus-based antioxidant, the storage stability of the raw material in the raw material preparation process can be enhanced and at the same time, coloration during polymerization can be suppressed, as a result, the hue of the resin obtained can be improved.

The polymerization catalyst used is preferably prepared as an aqueous solution in advance. The concentration of the aqueous catalyst solution is not particularly limited and may be adjusted to an arbitrary concentration according to the solubility of the catalyst for water. Instead of water, other solvents such as acetone, alcohol, toluene and phenol may be also selected.

Specific examples of the polymerization catalyst are described later. The property of water used to dissolve the polymerization catalyst is not particularly limited as long as the kind and concentration of the impurity contained are constant, but usually, distilled water, deionized water or the like is preferably used.

The reaction in the reactor above is described below.

<Early-Stage Reaction Step>

First, a mixture of the above-described dihydroxy compound and a carbonic acid diester is fed in the molten state to a vertical reactor and allowed to undergo a polycondensation reaction preferably at a temperature of 130 to 230° C.

This reaction is continuously performed in a multi-tank system using preferably one or more tanks, more preferably from 2 to 6 tanks, and it is preferred to distill off the byproduct monohydroxy compound at a ratio of 40 to 95% based on the theoretical amount. The reaction temperature is preferably from 130 to 230° C., more preferably from 150 to 220° C., and the pressure is preferably from 40 to 1 kPa.

In the case of a continuous reaction in a multi-tank system, it is preferred to sequentially raise the temperature of respective reactors within the range above and sequentially reduce the pressure of respective reactors within the range above. The average residence time is preferably from 0.1 to 10 hours, more preferably from 0.5 to 5 hours, still more preferably from 0.5 to 3 hours. If the temperature is too high, thermal deterioration may be accelerated to cause an increase in the production of a heterostructure or a colored ingredient and in turn, worsening of the quality of the resin. On the other hand, if the temperature is too low, the reaction rate may be decreased to cause reduction in the productivity.

The melt polycondensation reaction used in the present invention is an equilibrium reaction and therefore, the reaction is accelerated by removing the byproduct monohydroxy compound out of the reaction system. For this reason, the system is preferably in a depressurized state, and the pressure is preferably from 1 to 40 kPa, more preferably from 5 to 30 kPa.

If the pressure is too high, a monohydroxy compound may not be distilled off, as a result, the reactivity may be reduced, whereas if the pressure is too low, an unreacted dihydroxy compound or a raw material such as carbonic acid diester may be distilled off, making it difficult to control the reaction, or the raw material consumption rate may be worsened.

<Later-Stage Reaction Step>

The oligomer obtained in the early stage of the polycondensation process is fed to a horizontal stirring reactor and allowed to undergo a polycondensation reaction at an internal temperature of the reactor of preferably from 200 to 260° C. to obtain a polycarbonate. This reaction is continuously performed by using preferably one or more, more preferably from 1 to 3, horizontal stirring reactors.

The reaction temperature is preferably from 210 to 260° C., more preferably from 220 to 250° C. The pressure is preferably from 13.3 kPa to 10 Pa, more preferably from 1 kPa to 10 Pa. Among others, in the final polymerization reactor, the pressure is preferably from 1 kPa to 10 Pa, more preferably from 0.7 kPa to 10 Pa. The average residence time is preferably from 0.1 to 10 hours, more preferably from 0.5 to 5 hours, still more preferably from 0.5 to 2 hours.

<Reactor>

In the production method of the present invention where the polycondensation process is performed in a multi-tank system by using at least two reactors, a plurality of reactors containing a vertical stirring reactor are provided to increase the average molecular weight (reduced viscosity) of the polycarbonate.

Here, the reactor includes, for example, a vertical stirring reactor and a horizontal stirring reactor. Specific examples thereof include a stirring tank-type reactor, a thin-film reactor, a centrifugal thin-film evaporation reactor, a surface renewal-type twin-screw kneading reactor, a twin-screw horizontal stirring reactor, a wet wall-type reactor, a porous plate-type reactor allowing polymerization to proceed during a free fall, and a wire-attached porous plate-type reactor allowing polymerization to proceed during a fall along the wire. As described above, a vertical stirring reactor is preferably used in the early-stage reaction step, and a horizontal stirring reactor is preferably used in the later-stage reaction step.

In the reactor for use in the present invention, irrespective of early stage or later stage, in view of color tone of the polycarbonate, the surface material of component parts such as device and pipe constituting the reaction apparatus, in a portion coming into contact with a raw material monomer or a polymerization solution (hereinafter referred to as "liquid-contact portion"), is preferably composed of one member or two or more members of stainless steel having a nickel content of 10 wt % or more, glass, nickel, tantalum, chromium and Teflon (registered trademark), in a ratio of at least 90% or more of the total surface area of the liquid-contact part.

In the present invention, it is sufficient if the surface material in the liquid-contact portion is composed of the above-described substance, and a laminate of the above-described substance and another substance or a material obtained by plating another substance with the above-described substance can be used as the surface material.

The vertical stirring reactor is a reactor has a vertical rotating shaft and a stirring blade attached to the vertical rotating shaft. Examples of the type of the stirring blade include a turbine blade, a paddle blade, a Pfaudler blade, an anchor blade, a FULLZONE blade [manufactured by Shinko Pantec Co., Ltd.], a SANMELLER blade [manufactured by Mitsubishi Heavy Industries, Ltd.], a MAXBLEND blade [manufactured by Sumitomo Heavy Industries, Ltd.], and a helical ribbon or twisting lattice blade [manufactured by Hitachi, Ltd.].

Also, the horizontal stirring reactor is a reactor having a plurality of stirring blade-rotating shafts provided in the inside and laid horizontally (horizontal direction) and having a plurality of stirring blades extending almost perpendicularly to the rotating shaft, where stirring blades provided in each horizontal rotating shaft are arranged to avoid collision by displacing the horizontal position from each other.

Examples of the type of the stirring blade include a single shaft-type stirring blade such as disk and paddle, and a twine shaft-type stirring blade such as HVR, SCR, N-SCR [manufactured by Mitsubishi Heavy Industries, Ltd.], Bivolak [manufactured by Sumitomo Heavy Industries, Ltd.], and a spectacle-shaped or lattice blade [manufactured by Hitachi, Ltd.]. Other examples include stirring blades of a wheel type, a paddle type, a rod type and a window frame type.

Such a stirring blade is provided at least in two stages or more per rotating shaft, and surface renewal of the reaction solution is effected by stirring or spreading the reaction solution with the stirring blade. Also, assuming that the length of the horizontal rotating shaft of the horizontal reactor is L and the rotation diameter of the stirring blade is D, L/D is preferably from 1 to 15, more preferably from 2 to 14.

In the production method of the present invention, the reaction conditions of the final polymerization reactor affect not only the quality of the polycarbonate but also the production yield and therefore, by keeping the above-described conditions in mind, the reaction conditions are preferably set in consideration of both the quality and the yield.

In producing a polycarbonate by the present invention, similarly to normal polycarbonate, the viscosity of the reaction solution rises with the progress of reaction and therefore, in order to more effectively remove, out of the system, a monohydroxy compound (in the case of using DPC, phenol) occurring as a byproduct along with the progress of the polycondensation reaction and ensure the flowability of the reaction solution, respective reactors in a multi-tank system are preferably set to stepwise shift to a higher temperature and a higher vacuum within the above-described reaction conditions.

In order to prevent reduction in the quality such as color tone of the obtained polycarbonate, setting of as low a temperature as possible and as short a residence time as possible is preferred, but when the reaction temperature is lowered, the melt viscosity may be increased to cause reduction in the flowability of the reaction solution, as a result, particularly in the case of a horizontal stirring reactor, the reaction solution sometimes twines around a stirring shaft and does not run down.

When the reaction solution does not quantitatively flow to the outlet of the reactor, an air bubble may be entrained in the reaction solution and a strand containing an air bubble is broken in the pelletization process, leading to a stoppage of pelletization. Furthermore, an operation for connecting a strand to a cutter so as to recover the pelletization is performed and therefore, an extraneous matter attributable to a clothing fiber, a dust or the like may migrate into the product. Accordingly, it may not be sufficient to simply reduce the reaction temperature.

On the other hand, in view of color tone of the obtained polycarbonate, the residence time in the final polymerization reactor where the reaction temperature becomes highest must be minimized and therefore, the reaction solution charged into the final polymerization reactor preferably has as a low temperature as possible and a high molecular weight (high viscosity).

For this reason, the internal temperature of a penultimate reactor prior to a final polymerization reactor as the final stage is less than 230° C., preferably less than 225° C., more preferably less than 220° C., and is 200° C. or more, preferably 210° C. or more. On the other hand, if the temperature is too low, the reaction may not proceed sufficiently and the melt viscosity may rise excessively.

Also, the melt viscosity of the reaction solution at the outlet of the penultimate reactor prior to the final polymerization reactor is 100 Pa·s or more, preferably 120 Pa·s or more, more preferably 140 Pa·s or more, still more preferably 180 Pa·s or more, and on the other hand, is 1,000 Pa·s or less, preferably 800 Pa·s or less.

In order to remove a low molecular ingredient such as monohydroxy compound remaining in the polymer, the degree of vacuum in the final polymerization reactor is preferably as high as possible, but if the melt viscosity of the reaction solution is too low, the reaction solution may cause vigorous bubbling and an ideal plug-flow property may not be obtained, making it impossible to control the molecular weight.

Also, if the melt viscosity is too high, the flowability in the final polymerization reactor may be decreased, leading to an excessively long residence time, and the quality such as color tone of the obtained polycarbonate may be worsened. The melt viscosity of the reaction solution at the outlet of the penultimate reactor prior to the final polymerization reactor can be controlled to a desired melt viscosity by appropriately adjusting the temperature or pressure in the early-stage reaction, the amount of catalyst, or the like.

Incidentally, the melt viscosity as used in the description of the present invention indicates a melt viscosity at a shear rate of 91.2 $sec^{-1}$ as measured at the same temperature as the temperature of the reaction solution by using a capillary rheometer [manufactured by Toyo Seiki Ltd.].

The temperature of the heating medium of the final polymerization reactor is preferably 260° C. or less, more preferably 250° C. or less, still more preferably 240° C. or less. On the other hand, the temperature of the heating medium is preferably 210° C. or more, more preferably 220° C. or more, because if the temperature is too low, the viscosity may rise excessively.

Also, in the final polymerization reactor, in order to efficiently remove a low molecular ingredient from the reaction solution, the amount of a monohydroxy compound such as phenol contained in the reaction at the outlet of the penultimate reactor prior to the final polymerization reactor is preferably 3 wt % or less, more preferably 2 wt % or less, still more preferably 1.5 wt % or less. Incidentally, the amount of a monohydroxy compound contained is preferably smaller and is ideally 0 wt %, but this is practically impossible and the amount is usually 500 ppm or more.

The method for reducing the content of a monohydroxy compound includes, for example, a method of reducing the pressure or prolonging the residence time in a reactor previous to the final polymerization reactor, but it is preferred to adjust the reaction conditions so as to avoid an excessive rise in the viscosity of the reaction solution.

Furthermore, in the final polymerization reactor, the molecular weight must be increased to such an extent as allowing the obtained resin to have sufficient mechanical properties and therefore, the melt viscosity of the reaction solution at the outlet of the final polymerization reactor is preferably 1,800 Pa·s or more, more preferably 2,000 Pa·s or more, still more preferably 2,200 Pa·s or more.

On the other hand, if the melt viscosity is excessively raised, the flowability of the reaction solution is impaired or the load of the stirrer motor increases. Therefore, the melt viscosity is preferably 3,500 Pa·s or less, more preferably 3,200 Pa·s or less.

The melt viscosity of the reaction solution at the outlet of the final polymerization reactor can be controlled by adjusting the reaction conditions in the final polymerization reactor, such as temperature, pressure and residence time, or the amount of catalyst or adjusting the terminal group balance. The terminal group balance is adjusted by controlling the charge molar ratio of a carbonic acid diester and a dihydroxy compound or the amount of an unreacted monomer distilled in the early-stage reaction.

In the above-described reaction conditions, the rise in the molecular weight in the final polymerization reactor is, in terms of reduced viscosity, preferably in the range of the following formula (2). Q/P is preferably 1.5 or more, more preferably 1.6 or more, still more preferably 1.7 or more, and is preferably 2.5 or less, more preferably 2.4 or less, still more preferably 2.3 or less.

$$1.5 \leq Q/P \leq 2.5 \tag{2}$$

(P: the reduced viscosity of a reaction solution at the outlet of a penultimate reactor prior to the final polymerization reactor, and Q: the reduced viscosity of a reaction solution at the outlet of the final polymerization reactor).

When Q/P is not more than the upper limit above, the heat history can be prevented from excessively increasing in the final polymerization reactor and the color tone of the obtained resin can be enhanced. Also, when Q/P is not less than the lower limit above, the heat history prior to the final polymerization reactor can be prevented from excessively increasing and similarly, the color tone of the obtained resin can be enhanced. In addition, the molecular weight can be prevented from exceeding the target value in the final polymerization reactor, and control of the reaction is facilitated.

As described above, each of Q and P can be adjusted by adjusting the temperature, pressure, residence time, amount of catalyst, terminal group balance or the like, and Q/P can be controlled by appropriately combining these conditions.

For example, in a penultimate reactor prior to the final polymerization, the temperature is lowered, the pressure is raised or the residence time is reduced, thereby decreasing P, and since Q is simultaneously decreased under such a condition, the pressure in the final polymerization reactor is reduced so as to keep Q constant, whereby Q/P can be made large.

A polycarbonate using, as a monomer, a dihydroxy compound having a structural moiety of formula (1) or an aliphatic dihydroxy compound produces a double bond terminal upon thermal decomposition. The amount of this terminal group is indicative of heat history of the reaction solution, and as the reaction is performed at a higher temperature or for a longer time, the amount of the double bond terminal increases.

Each of the amount of the double bond terminal group in the reaction solution at the outlet of a penultimate reactor prior to the final polymerization reactor and the amount of the double bond terminal group in the reaction solution at the outlet of the final polymerization reactor is preferably in the range satisfying the following formula (3). The values of X and Y in formula (3) can be controlled by appropriately setting the reaction temperature and reaction time for each of the penultimate reactor prior to the final polymerization reactor, and the final polymerization reactor.

$$Y-X \leq 6 \text{ and at the same time, } X \leq 5 \tag{3}$$

[X: the amount (mol/ton) of a double bond terminal structure in a reaction solution at the outlet of a penultimate reactor prior to the final polymerization reactor, and Y: the amount (mol/ton) of a double bond terminal structure in a reaction solution at the outlet of the final polymerization reactor].

As a specific example of the double bond terminal, for example, a terminal group of the following structural formula (7) or (7') is produced from ISB. Also, a terminal group of the following structural formula (8) or (8') is produced from 1,4-cyclohexanedimethanol (CHDM). Using a general structural formula, a double bond terminal represented by the following structural formula (10) is produced from a dihydroxy compound having a hydroxy group represented by the following structural formula (9).

The amount of a double bond terminal structure as used in the present invention indicates the total amount of terminal structures represented by the following structural formulae (7), (7'), (8) and (8') contained in the resin. The amount of a double bond terminal produced can be determined by $^1$H NMR measurement of the polycarbonate.

[Chem. 4]

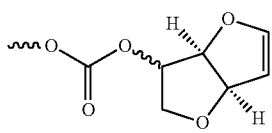
(7)

[Chem. 5]

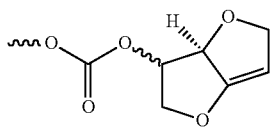
(7')

[Chem. 6]

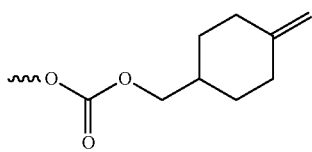
(8)

[Chem. 7]

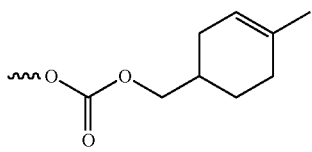
(8')

[Chem. 8]

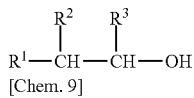
(9)

[Chem. 9]

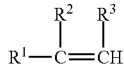
(10)

In structural formulae (9) and (10), each of $R^1$, $R^2$ and $R^3$ is a hydrogen atom or an alkyl group which may have a substituent.

In the polymerization of a normal polycarbonate, in the case of a vertical stirring reactor, the residence time is appropriately controlled by increasing or decreasing the liquid volume in the reactor according to the throughput of the reaction solution (the amount of the resin produced). However, in the final polymerization reactor, the melt viscosity of the reaction solution becomes very high, and it is difficult to control the liquid volume in the reaction. Therefore, the final polymerization reactor is preferably set to an appropriate volume for the throughput of the reaction solution. In the case of a polycarbonate using the specific dihydroxy compound for use in the present invention, thermal decomposition is more likely to occur than bisphenols used for a normal polycarbonate, and therefore, stricter conditions are imposed on the adjustment of the liquid volume.

For this reason, the final polymerization reactor for use in the present invention preferably satisfies the following formula (5). V/A is preferably 2 or more, more preferably 3 or more, and on the other hand, is preferably 9 or less, more preferably 8 or less.

$$2 \leq V/A \leq 9 \quad (5)$$

[V: the volume (L) of the horizontal reactor, and A: the throughput (kg/hr) of a reaction solution].

When V/A is not more than the upper limit, the volume of the reactor is not excessively large for the amount of the reaction solution and even when the residence time is shortened, the liquid volume in the reactor is kept at an appropriate amount, and the reaction solution stably flows to the outlet of the reactor, resulting in a good yield of pelletization. Also, even when the liquid volume is increased to exceed the appropriate amount, the residence time does not become too long, and the color tone of the obtained resin can be prevented from worsening, or the molecular weight does not rise to exceed the target value, making it easy to control the reaction.

When V/A is not less than the lower limit, a sufficient residence time is ensured, and a desired molecular weight can be achieved. Also, the surface renewal property of the reaction solution is not reduced, so that an increase in the residual low molecular ingredient such as monohydroxy compound (for example, phenol) can be prevented and the quality of the obtained resin can be enhanced.

In order to adjust V/A, for example, after the volume V of the horizontal reactor used is determined, when the throughput A of the reaction solution is increased, V/A becomes small, and when the throughput A of the reaction solution is decreased, V/A becomes large.

Incidentally, in the case of producing the polycarbonate of the present invention by using, as the carbonic acid diester, diphenyl carbonate or a substituted diphenyl carbonate such as ditolyl carbonate, phenol or a substituted phenol, which are a monohydroxy compound, occurs as a byproduct and unavoidably remains in the polycarbonate. This monohydroxy compound such as phenol or substituted phenol sometimes causes an odor during molding.

A polycarbonate obtained not by a continuous system as in the present invention but by normal batch reaction contains 1,000 ppm or more of an aromatic ring-containing monohydroxy compound such as byproduct phenol. Incidentally, such a monohydroxy compound may have a substituent depending on the raw material used and, for example, may have an alkyl group having a carbon number of 5 or less.

In order to reduce a residual low molecular ingredient in the resin, including the monohydroxy compound above, it is effective to reduce the pressure in the final polymerization reactor as much as possible and distill off such an ingredient. However, in the case of a polycarbonate using, as a monomer, a dihydroxy compound having a structural moiety of formula (1) typified by ISB, as compared with the conventional aromatic polycarbonate using bisphenol A as a monomer, the equilibrium constant of reaction is large and therefore, the increasing rate of the molecular weight in the later-stage reaction is high. Therefore, when the pressure is reduced, the reaction is excessively accelerated and the reaction can be hardly controlled.

Although the reaction rate usually becomes maximum when the amount of a hydroxyl terminal and the amount of a phenyl carbonate terminal represented by the following structural formula (11) are equivalent, in the production method of the present invention, the amount of a hydroxy terminal is decreased and the amount of a phenyl carbonate terminal is increased, whereby the viscosity increase rate can be slowed and the pressure in the final polymerization reactor can be reduced. Furthermore, as the amount of a hydroxy terminal is smaller, there is also produced an effect that the thermal stability of the obtained polycarbonate is enhanced, for example, coloration when the resin is melted and retained is reduced.

[Chem. 10]

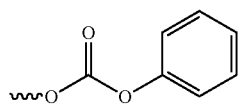

(11)

Such a terminal group balance can be controlled by the charge molar ratio when all dihydroxy compounds used for reaction and a carbonic acid ester are charged into an initial first reactor, and the molar ratio of the carbonic acid diester to all dihydroxy compounds is preferably from 0.990 to 1.030, more preferably 0.995 or more and more preferably 1.25 or less.

When the molar ratio is not more than the upper limit above, the hydroxy terminal can be prevented from disappearing in the later-stage reaction and a desired molecular weight can be achieved. When the molar ratio is not less than the lower limit above, the hydroxy terminal is prevented from increasing and the thermal stability of the obtained resin is enhanced.

By controlling the terminal balance in this way, the viscosity increase rate in the final polymerization reactor can be controlled, and the pressure in the final polymerization reactor can be reduced. The pressure of the final polymerization reactor is preferably 1 kPa or less, more preferably 0.7 kPa or less, still more preferably 0.5 kPa or less. Incidentally, the pressure is preferably lower, but the limit of pressure reduction is 10 Pa in many cases.

In this way, the amount of a hydroxy terminal group of the polycarbonate resin obtained by polycondensation in the present invention is preferably 50 mol/ton or less, more preferably 45 mol/ton or less, still more preferably 40 mol/ton or less, at the outlet of the final polymerization reactor.

A smaller amount of a hydroxy terminal group contained in the obtained polycarbonate resin is preferred in view of thermal stability, but if a hydroxy terminal completely disappears, the reaction may reach a plateau and a desired molecular weight may not be achieved. Therefore, the polycarbonate resin preferably contains 10 mol/ton or more of a hydroxy terminal.

The hydroxy terminal group can be controlled by the charge molar ratio of the carbonic acid diester to all dihydroxy compounds. When the charge amount of the carbonic acid diester is increased, the amount of a hydroxy terminal group decreases.

The amount of a monohydroxy compound contained in the polycarbonate resin obtained by polycondensation in the present invention is, in a reaction solution at the outlet of a penultimate reactor prior to the final polymerization reactor, preferably from 1,000 ppm to 3 wt %. Also, in a reaction solution at the outlet of the final polymerization reactor, the amount is preferably 700 ppm or less, more preferably 500 ppm or less, still more preferably 200 ppm or less. However, it is industrially difficult to completely remove the monohydroxy compound, and the lower limit of the content of the monohydroxy compound is usually 1 ppm.

As described above, the polycarbonate obtained by polycondensation of dihydroxy compounds containing the specific dihydroxy compound according to the present invention is lower in the thermal stability than the conventional aromatic polycarbonate and therefore, the reaction temperature must be set as low as possible. In turn, the viscosity of the reaction solution is high as compared with the conventional polycarbonate.

When the viscosity of the reaction solution is high, the reaction solution may twine around a stirring shaft and fail in running down. In the case where a horizontal reactor having a plurality of horizontal rotating shafts is used inside of the final polymerization reactor, the rotation speed of the stirring blade must be set appropriately according to the melt viscosity of the reaction solution so as to stably withdraw the reaction solution from the reactor, and the rotation speed of the stirring blade is preferably set in the range of the following formula (4):

$$500 \leq \omega\mu \leq 20{,}000 \quad (4)$$

[ω: the rotation speed (rpm) of a stirring blade, and μ: the melt viscosity (Pa·s) of a reaction solution at the outlet of the horizontal reactor].

ωμ is preferably 500 or more and, on the other hand, is preferably 20,000 or less. Incidentally, this condition does not depend on the shaft diameter of the stirring blade and therefore is irrelevant to the reaction scale. When ωμ is 20,000 or less, the reaction solution can be prevented from twining around the stirring shaft and not only the yield can be enhanced in the pelletization process but also increase of an extraneous matter in the resin can be suppressed. When ωμ is 500 or more, a sufficiently high stirring efficiency can be obtained, so that the amount of a low molecular ingredient remaining in the reaction solution can be reduced and at the same time, the reaction solution can be kept from residing on the reactor wall surface, making it possible to prevent worsening of the color tone.

With respect to the method for controlling ωμ, for example, in the case of increasing the molecular weight of the reaction solution by reducing the pressure of the horizontal reactor whose temperature is kept constant, since the melt viscosity μ of the reaction solution rises and ωμ becomes large, ωμ can be caused to fall in the preferred range by reducing the rotation speed ω of the stirring blade along with increase of the molecular weight.

The polycarbonate obtained by polycondensation in the present invention is preferably, still in the molten state, passed through a filter to strain out an extraneous matter, after the polycondensation reaction above is performed. In particular, for implementing the removal of a low molecular weight ingredient contained in the resin or the addition/kneading of a heat stabilizer and the like, it is preferred that the resin obtained by polycondensation is introduced into an extruder and subsequently, the resin discharged from the extruder is filtered using a filter.

<Steps After Polycondensation Reaction>

In the production method of the present invention, the method for filtering the polycarbonate resin obtained by polycondensation, by using a filter includes, for example, the following methods: a method where the resin is withdrawn in the molten state from the final polymerization reactor by using a gear pump, a screw or the like so as to generate a pressure necessary for filtration and filtered through a filter; a method where the resin is fed in the molten state to a single-screw or twin-screw extruder from the final polymerization reactor, melt extruded, filtered through a filter, then cooled/solidified in the form of a strand and pelletized by a rotary cutter or the like; a method where the resin is fed in the molten state to a single-screw or twin-screw extruder from the final polymerization reactor, melt extruded, once cooled/solidified in the form of a strand and pelletized and thereafter, the pellet is again introduced into an extruder, filtered through a filter, then cooled/solidified in the form of a strand and pelletized; and a method where the resin is withdrawn in the molten state from the final polymerization reactor, cooled/solidified in the form of a strand without passing through an extruder and once pelletized and thereafter, the pellet is fed to a single-screw or twin-screw extruder, melt extruded, filtered through a filter, cooled/solidified in the form of a strand and pelletized.

Among these methods, in order to minimize the heat history and prevent thermal deterioration such as worsening of the hue or reduction in the molecular weight, a method where the resin is fed in the molten state to a single-screw or twin-screw extruder from the final polymerization reactor, melt extruded, then directly filtered through a filter, cooled/solidified in the form of a strand and pelletized by a rotary cutter or the like, is preferred. This is specifically described below.

In the present invention, the form of the extruder is not limited, but a single-screw or twin-screw extruder is usually used. Among others, for enhancing the later-described devolatilization performance or achieving uniform kneading of an additive, a twin-screw extruder is preferred. In this case, the rotation directions of the shafts may different directions or the same direction, but in view of kneading performance, the same direction is preferred. By the use of an extruder, feeding of a polycarbonate resin to a filter can be stabilized.

Meanwhile, a raw material monomer, a byproduct monohydroxy compound occurring in the transesterification reaction, or a low-molecular-weight compound such as polycarbonate oligomer, which may have an adverse effect on the hue or thermal stability as well as on the product due to bleed-out or the like, usually remains in the polycarbonate obtained by polycondensation as above, but it is also possible to devolatilize/remove such a compound by using an extruder having a vent opening and preferably reducing the pressure through the vent opening by means of a vacuum pump or the like. In addition, the devolatilization may be accelerated by introducing a volatile liquid such as water into the extruder. The number of vent openings may be one or plural but is preferably 2 or more.

Furthermore, in the extruder above, a heat stabilizer, a neutralizer, an ultraviolet absorber, a release agent, a coloring agent, an antistatic agent, a slip agent, a lubricant, a plasticizer, a compatibilizer, a flame retardant and the like, which are commonly known, may be also added and kneaded.

In the present invention, the polycarbonate resin obtained by polycondensation is preferably filtered through a filter so as to remove an extraneous matter contained in the resin, such as burn deposit and gel. Among others, in order to remove the residual monomer, by-product phenol and the like by devolatilization under reduced pressure and mix an additive such as heat stabilizer and release agent, the polycarbonate resin extruded by the extruder above is preferably filtered through a filter.

As for the form of the filter, a known filter such as candle type, pleat type and leaf disc type can be used, but among others, a leaf disc type capable of providing for a large filtration area relative to the filter containment vessel is preferred and also, a plurality of discs are preferably combined and used so that a large filtration area can be provided for.

The filter for use in the present invention is composed by combining a filtration member (hereinafter, sometimes referred to as medium) with a holding member (sometimes referred to as retainer) and is used in the form of a unit (sometimes referred to as filter unit) where those filters (depending on the case, a plurality of sheets or a plurality of pieces) are housed in a containment vessel.

In the present invention, in order to reduce the differential pressure (pressure loss) of the filter, a filter of a type where a plurality of perforated media are overlapped and the opening size decreases in sequence from the direction in which the resin intrudes, is preferred. A filter of a type where a metal-made powder is sintered on the filter surface so as to pulverize a gel, may be also used.

The material for the medium of the filter is not particularly limited as long as it has strength and heat resistance necessary for filtration of the obtained polycarbonate resin, but in particular, a stainless steel-based material with a small iron content, such as SUS316 and SUS316L, is preferred. As for the kind of weaving, a filter where the extraneous matter trapping portion is in a regularly woven state, such as plain woven, twilled, plain Dutch woven and twilled Dutch woven, and in addition, a nonwoven fabric-type filter may be used. In the present invention, a nonwoven fabric type having a high ability of trapping a gel, among others, a type where steel wires constituting the nonwoven fabric are fixed to each other by sintering, is preferred.

In the present invention, the opening size of the filter is, in terms of 99% filtration accuracy, preferably 50 μm or less, more preferably 40 μm or less, still more preferably 20 μm or less, and in the case of decreasing particularly an extraneous matter, the opening size is preferably 10 μm or less.

If the opening size is small, the pressure loss in the filter may be increased to cause breakage of the filter or the polycarbonate resin may be deteriorated due to shear heat generation. Therefore, the opening size is, in terms of 99% filtration accuracy, preferably 1 μm or more.

Incidentally, the opening size defined here as 99% filtration accuracy indicates the value of $\chi$ when the $\beta\chi$ value represented by the following formula (12) determined in accordance with ISO 16889 (2008) is 1,000.

$$\beta\omega = (\text{number of particles on the primary side larger than } \chi \, \mu m)/(\text{number of particles on the secondary side larger than } \chi \, \mu m) \quad (12)$$

(wherein the primary side indicates before filtration through a filter, and the secondary side indicates after filtration).

In this connection, among the filters described above, a filter made of stainless steel containing an iron ingredient is likely to deteriorate the resin during filtration at a high temperature of more than 200° C., and therefore, the filter is preferably subjected to a passivation treatment before use.

Examples of the method for the passivation treatment include a method of dipping the filter in an acid such as nitric acid or flowing an acid through the filter, thereby forming a passivation film on the surface, a method of applying a roasting (heating) treatment in the presence of water vapor or oxygen, and a method using these methods in combination. Among others, it is preferred to perform both a nitric acid treatment and roasting.

The roasting temperature is preferably from 350 to 500° C., more preferably from 350 to 450° C., and the roasting time is preferably from 3 to 200 hours, more preferably from 5 to 100 hours. If the roasting temperature is too low or the roasting time is too short, insufficient formation of a passivation film may result, and the filter tends to deteriorate the polycarbonate resin during filtration. On the other hand, if the roasting temperature is too high or the roasting time is too long, the filer medium may be seriously damaged, failing in producing the necessary filtration accuracy.

Also, at the time of treating the filter with a nitric acid, the nitric acid concentration is preferably from 5 to 50 wt %, more preferably from 10 to 30 wt %, the treatment temperature is preferably from 5 to 100° C., more preferably from 50 to 90°

C., and the treatment time is preferably from 5 to 120 minutes, more preferably from 10 to 60 minutes.

If the nitric acid concentration is too low, the treatment temperature is too low or the treatment time is too short, insufficient formation of a passivation film may result, whereas if the nitric acid concentration is too high, the treatment temperature is too high or the treatment time is too long, the filter media may be seriously damaged, failing in producing the necessary filtration accuracy.

Incidentally, the material for the containment vessel of the filter used in the production method of the present invention is not particularly limited as long as it has strength and heat resistance enough to withstand filtration of the resin, but a stainless steel-based material with a small iron content, such as SUS316 and SUS316L, is preferred.

In the filter containment vessel, the feed port and the discharge port for the polycarbonate resin may be arranged substantially in a horizontal configuration, may be arranged substantially in a vertical configuration, or may be arranged in an oblique configuration, but in order to reduce the residence time of a gas and the polycarbonate in the containment vessel and prevent deterioration of the polycarbonate, it is preferred to arrange the feed port for the polycarbonate in the lower part of the filter containment vessel and arrange the discharge port in the upper part.

Furthermore, in the production method of the present invention, for stabilizing the amount of the polycarbonate resin fed to the filter, a gear pump is preferably disposed between the extruder and the filter. The kind of the gear pump is not limited, but, among others, a self-circulation type not using a gland packing in the sealed part is preferred from the standpoint of decreasing an extraneous matter.

In the present invention, the strand formation and pelletization, at which the polycarbonate resin comes into direct contact with outside air, are preferably performed in a clean room where the cleanliness defined in JIS B 9920 (2002) is higher than class 7, more preferably higher than class 6.

The polycarbonate resin filtered through the filter is cooled/solidified and pelletized by a rotary cutter or the like, and at the time of pelletization, a cooling method such as air cooling and water cooling is preferably used. As for the air used in air cooling, an air after an airborne extraneous matter is previously removed through a hepafilter or the like is preferably used so as to prevent reattachment of an airborne extraneous matter.

In the case of employing water cooling, water after a metallic matter in the water is removed by using an ion-exchange resin or the like and furthermore, an extraneous matter in the water is removed through a filter for water, is preferably used. The opening size of the filter for water used is preferably from 10 to 0.45 μm in terms of filtration accuracy for 99% rejection.

<Steps Before Polycondensation Reaction>

On the other hand, in the production method of the present invention, for more decreasing an extraneous matter, it is also effective to filter the raw material monomer through a filter before polycondensation. Hereinafter, this filter is referred to as a raw material filter.

Incidentally, the shape of the raw material filter used here may be of any type such as basket type, disc type, leaf disc type, tube type, flat cylinder type and pleated cylinder type. Among others, a pleated type that is compact and capable of providing for a large filtration area, is preferred.

Also, the filter element constituting the raw material filter may be any of a metal winding, a laminated metal mesh, a metallic nonwoven fabric, a porous metal sheet and the like. In view of filtration accuracy, a laminated metal mesh or a metallic nonwoven fabric is preferred, and a filter element of a type where a metallic nonwoven fabric is fixed by sintering, is more preferred.

The material for the raw material filter is not particularly limited and, for example, a metal-made filter, a resin-made filter or a ceramic-made filter may be used, but in view of heat resistance or reduced coloration, a metal-made filter having an iron content of 80% or less is preferred, and a filter made of a stainless steel such as SUS304, SUS316, SUS316L and SUS310S is more preferred.

At the filtration of the raw material monomer, a plurality of filter units are preferably used so as to extend the life of the raw material filter while ensuring the filtration performance. In particular, assuming that the opening size of the filter in a unit on the upstream side is C [μm] and the opening size of the filter in a unit on the downstream side is D [μm], C is preferably larger than D (C>D) in at least one combination of filter units. When this condition is satisfied, the filter is less likely to clog and the exchange frequency of the raw material filter can be reduced.

The opening size of the raw material filter is not particularly limited but, in at least one filter, the opening size is preferably 10 μm or less in terms of 99% filtration accuracy. In the case where a plurality of filters are disposed, the opening size is preferably 8 or more, more preferably 10 or more, on the most upstream side, and is preferably 2 or less, more preferably 1 or less, on the most downstream side. Incidentally, the opening size of the raw material filter as used herein is also determined in accordance with ISO 16889 (2008) described above.

Also, in the present invention, the temperature of the raw material fluid at the time of passing a raw material through the raw material filter is not limited, but if the temperature is too low, the raw material may be solidified, whereas if the temperature is too high, there may occur a trouble such thermal decomposition. Therefore, the temperature is preferably from 100 to 200° C., more preferably from 100 to 150° C.

Furthermore, in the present invention, any raw material out of a plurality of kinds of raw materials used may be filtered or all raw materials may be filtered. The method therefor is not limited, and a raw material mixture of a dihydroxy compound and a carbonic acid diester may be filtered, or these raw materials may be separately filtered and then mixed. Also, in the production method of the present invention, a reaction solution may be filtered through a filter halfway through the polycondensation reaction.

<One Example of Production Apparatus>

One example of the production method of the present invention to which this embodiment is applied is specifically described by referring to FIG. 1. The production apparatus, raw material and catalyst described below are an example of the embodiment of the present invention, and the present invention is not limited to the following examples.

FIG. 1 is a view illustrating an example of the production apparatus used in the production method of the invention. In the production apparatus shown in FIG. 1, the polycarbonate of the present invention is produced through a raw material preparation process of preparing the above-described dihydroxy compound and a carbonic acid diester, which are raw materials, and a polycondensation process of causing these raw materials to undergo a polycondensation reaction in the molten state by using a plurality of reactors. The liquid distillate produced in the polycondensation process is liquefied in condensers 12a, 12b, 12c and 12d and recovered in a liquid distillate recovery tank 14a.

After the polycondensation process, a polycarbonate pellet is formed through a step of devolatilizing and removing an unreacted raw material and a reaction byproduct in the polymerization reaction solution, a step of adding a heat stabilizer, a release agent, a coloring material and the like, and a step of forming the polycarbonate into a pellet having a predetermined particle diameter.

In the following, the production apparatus is described by referring to, by example, a case of using isosorbide (ISB) and 1,4-cyclohexanedimethanol (CHDM) as raw material dihydroxy compounds, using diphenyl carbonate (DPC) as a raw material carbonic acid diester, and using calcium acetate as a catalyst. ISB comes under the above-described specific dihydroxy compound.

First, in the raw material preparation process, a DPC melt prepared at a predetermined temperature in a nitrogen gas atmosphere is continuously fed to a raw material mixing tank $2a$ from a raw material feed port $1a$. Also, an ISB melt and a CHDM melt each weighed in a nitrogen gas atmosphere are continuously fed to the raw material mixing tank $2a$ from raw material feed ports $1b$ and $1c$, respectively. In the raw material mixing tank $2a$, these materials are mixed to obtain a molten mixture of raw materials.

The obtained molten mixture of raw materials is continuously fed to a first vertical stirring reactor $6a$ through a raw material feed pump $4a$ and a raw material filter $5a$. Also, as a raw material catalyst, an aqueous calcium acetate solution is continuously fed from a catalyst feed port $1d$ provided in the middle of a transfer pipe for the molten mixture of raw materials.

In the polycondensation process of the production apparatus shown in FIG. 1, a first vertical stirring reactor $6a$, a second vertical stirring reactor $6b$, a third vertical stirring reactor $6c$, and a fourth horizontal stirring reactor $6d$ are provided in series. In each reactor, a polycondensation reaction is performed by keeping the liquid level constant, and the polymerization reaction solution discharged from the bottom of the first vertical stirring reactor $6a$ is continuously fed in sequence to the second vertical stirring reactor $6b$, then to the third vertical stirring reactor $6c$ and further to the fourth horizontal stirring reactor $6d$, thereby allowing a polycondensation reaction to proceed.

The reaction conditions in respective reactors are preferably set to shift to a higher temperature, a higher vacuum and a lower stirring speed with the progress of the polycondensation reaction. In the case of using the apparatus of FIG. 1, the fourth horizontal stirring reactor $6d$ corresponds to the final polymerization reactor in the present invention, and the third vertical stirring reactor $6c$ corresponds to the penultimate reactor prior to the final polymerization reactor.

The first vertical stirring reactor $6a$, the second vertical stirring reactor $6b$ and the third vertical stirring reactor $6c$ are provided with MAXBLEND blades $7a$, $7b$ and $7c$, respectively. The fourth horizontal stirring reactor $6d$ is provided with a two-shaft spectacle-shaped stirring blade $7d$. After the third vertical stirring reactor $6c$, a gear pump $4b$ is provided, because the reaction solution transferred comes to have a high viscosity.

In the first vertical stirring reactor $6a$ and the second vertical stirring reactor $6b$, the amount of heat supplied may become large in particular and in order to prevent the temperature of the heating medium from rising excessively, internal heat exchangers $8a$ and $8b$ are provided, respectively.

Incidentally, in these four reactors, distillation tubes $11a$, $11b$, $11c$ and $11d$ for discharging a byproduct and the like occurring by the polycondensation reaction are attached, respectively. In the first vertical stirring reactor $6a$ and the second vertical stirring reactor $6b$, reflux condensers $9a$ and $9b$ and reflux tubes $10a$ and $10b$ are provided, respectively, so as to return a part of the liquid distillate to the reaction system. The reflux ratio can be controlled by appropriately adjusting each of the pressure of the reactor and the heating medium temperature of the reflux condenser.

The distillation tubes $11a$, $11b$, $11c$ and $11d$ are connected to condensers $12a$, $12b$, $12c$, and $12d$, respectively, and each reactor is kept in a predetermined depressurized state by a decompressor $13a$, $13b$, $13c$ or $13d$.

Incidentally, in this embodiment, a byproduct such as phenol (monohydroxy compound) is continuously liquefied and recovered from the condensers $12a$, $12b$, $12c$, and $12d$ attached to respective reactors. Also, a cold trap (not shown) is provided on the downstream side of the condensers $12c$ and $12d$ attached to the third vertical stirring reactor $6c$ and the fourth horizontal stirring reactor $6d$, respectively, and a byproduct is continuously solidified and recovered.

The reaction solution that has reached a predetermined molecular weight is withdrawn from the fourth horizontal stirring reactor $6d$, transferred by a gear pump $4c$ to a twin-screw extruder $15a$. The twin-screw extruder has a vacuum vent to remove a residual low molecular ingredient in the polycarbonate. Also, if desired, an antioxidant, a light stabilizer, a coloring agent, a release agent and the like are added.

The resin is fed by a gear pump $4d$ to a polymer filter $15b$ from the twin-screw extruder $15a$, and an extraneous matter is strained out. The resin passed through the filter is withdrawn in strand form from a die head and thereafter, the resin is cooled/solidified with water in a strand cooling tank $16a$ and then pelletized by a strand cutter $16b$. The obtained pellet is pneumatically transported by a pneumatic blower $16c$ and delivered to a product hopper $16d$. A predetermined amount of a product weighed by a weigh scale $16e$ is packaged in a product bag $16f$.

<Start of Melt Polycondensation in Continuous Production Apparatus>

In this embodiment, the polycondensation based on the transesterification reaction of a dihydroxy compound and a carbonic acid diester is started according to the following procedure.

First, in the continuous production apparatus shown in FIG. 1, each of four reactors connected in series (first vertical stirring reactor $6a$, second vertical stirring reactor $6b$, third vertical stirring reactor $6c$, and fourth horizontal stirring reactor $6d$) is previously set to a predetermined internal temperature and a predetermined pressure. Here, the internal temperature of each reactor, the temperature of the heating medium, and the pressure are not particularly limited but are preferably set as follows.

(First Vertical Stirring Reactor $6a$)

Internal temperature: from 130 to 230° C., pressure: from 40 to 10 kPa, temperature of heating medium: from 140 to 240° C., reflux ratio: from 0.01 to 10.

(Second Vertical Stirring Reactor $6b$)

Internal temperature: from 150 to 230° C., pressure: from 40 to 8 kPa, temperature of heating medium: from 160 to 240° C., reflux ratio: from 0.01 to 5.

(Third Vertical Stirring Reactor $6c$)

Internal temperature: from 170 to 230° C., pressure: from 10 to 1 kPa, temperature of heating medium: from 180 to 240° C.

(Fourth Horizontal Stirring Reactor $6d$)

Internal temperature: from 210 to 260° C., pressure: from 1 kPa to 10 Pa, temperature of heating medium: from 210 to 260° C.

Separately, in the raw material mixing tank $2a$, the above-described dihydroxy compound and carbonic acid diester are mixed in a predetermined molar ratio in a nitrogen gas atmosphere to obtain a molten mixture of raw materials.

After the internal temperature and pressure of each of those four reactors have reached values within the range of ±5% of respective set values, the molten mixture of raw materials separately prepared in the raw material mixing tank 2a is continuously fed to the first vertical stirring reactor 6a. Simultaneously with the start of feeding of the molten mixture of raw materials, a catalyst is continuously fed to the first vertical stirring reactor 6a through the catalyst feed port 1d to start a transesterification reaction.

In the first vertical stirring reactor 6a where a transesterification reaction is performed, the liquid level of the polymerization reaction solution is kept constant so as to ensure a predetermined average residence time. The method for keeping the liquid level in the first vertical stirring reactor 6a constant includes, usually, a method of controlling the degree of opening of a valve (not shown) provided in a polymer discharge line at the bottom while detecting the liquid level by a level gauge or the like.

Subsequently, the polymerization reaction solution is, in a continuous and sequential manner, discharged from the bottom of the first vertical stirring reactor 6a, fed to the second vertical stirring reactor 6b, then discharged from the bottom of the second vertical stirring reactor 6b, and fed to the third vertical stirring reactor 6c.

In this early-stage reaction step, the byproduct phenol is distilled off in a ratio of 50 to 95% based on the theoretical amount, and an oligomer is produced. In the present invention, the internal temperature of the third vertical stirring reactor 6c must be from 200° C. to less than 230° C.

Thereafter, the oligomer obtained in the early-stage reaction step is transferred by the gear pump 4b and fed to the fourth horizontal stirring reactor 6d, and under the temperature and pressure conditions suitable for performing a later-stage reaction described below, a byproduct phenol and a part of an unreacted monomer are removed out of the system through the distillation tube 11d, whereby a polycarbonate is produced.

The fourth horizontal stirring reactor 6d has one horizontal rotating shaft or two or more horizontal rotating shafts, where stirring blades extending in the vertical direction from the rotating shaft, such as disk type, wheel type, paddle type, rod type and window frame type, are disposed individually or in combination of two or more in at least two or more stages in the horizontal direction per rotating shaft.

In the case of having two or more horizontal rotating shafts, stirring blades provided on each horizontal rotating shaft are arranged by displacing the horizontal position so as to avoid collision with each other. The reaction solution is stirred or spread by means of such a stirring blade to thereby perform surface renewal of the reaction solution.

As for the shape thereof, assuming that the length of the horizontal rotating shaft is L and the rotation diameter of the stirring blade is D, L/D is from 1 to 15. Incidentally, the term "surface renewal of the reaction solution" as used in the description of the present invention means that the reaction solution on the liquid surface is replaced by the reaction solution below the liquid surface.

Figure 2:
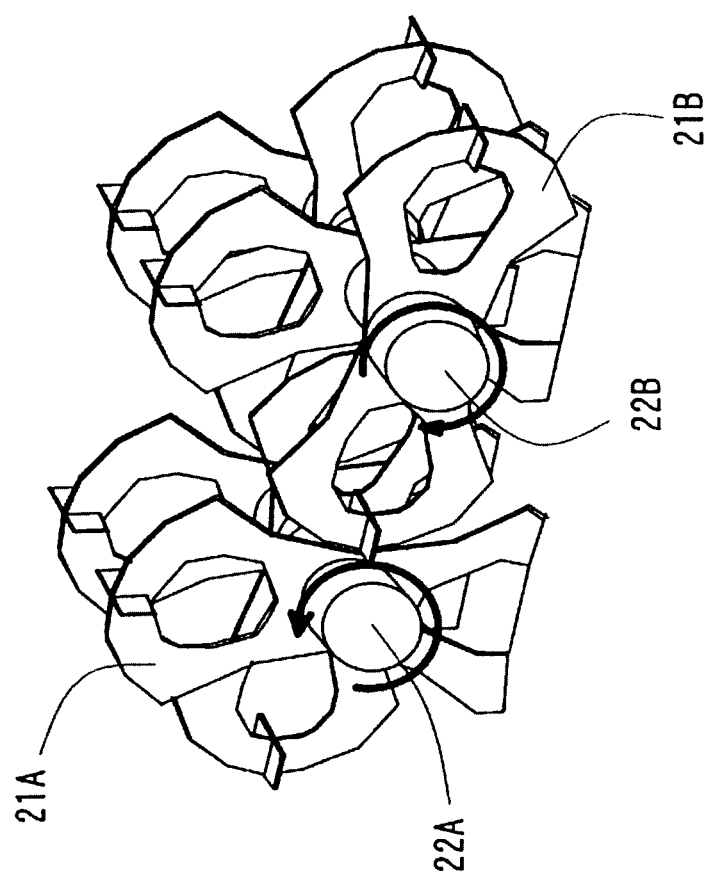
FIG. 2 is a perspective view of a two-shaft spectacle-shaped stirring blade.
Figure 3:
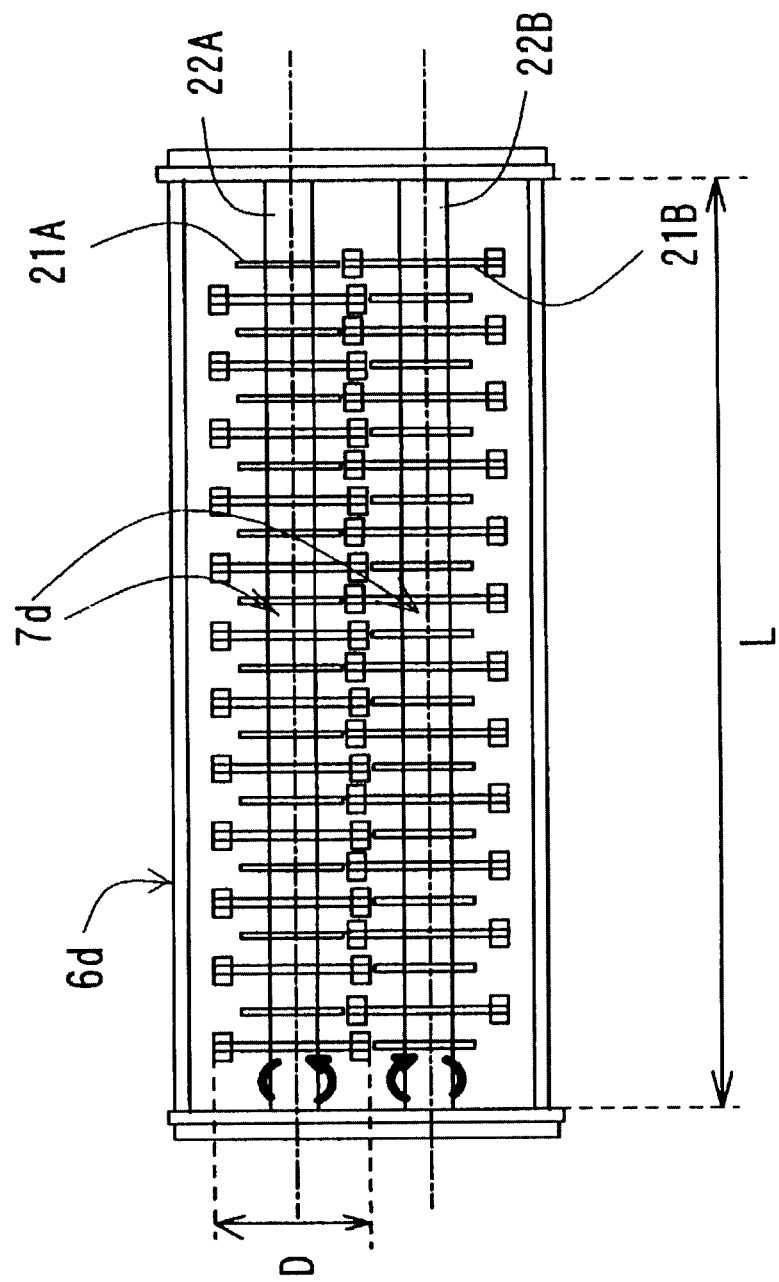
FIG. 3 is a plan schematic view showing an example of the horizontal stirring reactor.

As the fourth horizontal stirring reactor 6d, FIGS. 2 and 3 show an example of a stirrer having a two-shaft spectacle-shaped stirring blade 7d. FIG. 2 is a perspective view of the two-shaft spectacle-shaped stirring blade 7d, and FIG. 3 is a schematic view when the horizontal stirring reactor 6d containing the stirring blade is viewed from above.

Stirring blades 21A and 21B are in a 90° phase difference relationship, and respective shafts 22A and 22B are inversely rotating. This configuration allows distal end portions of respective stirring blades 21A and 21B to rotate while scraping off the resin attached to the other party stirring blade 21B or 21A. A plurality of such stirring blades 21A or 21B are provided in the axial direction.

The reaction temperature in the later-stage reaction step is preferably from 200 to 260° C., more preferably from 210 to 250° C., and the reaction pressure is preferably from 13.3 kPa to 10 Pa, more preferably from 2 kPa to 30 Pa, still more preferably from 1 kPa to 50 Pa.

In the production method of the present invention, the fourth horizontal stirring reactor 6d used is a reactor having a large holdup volume in view of unit structure as compared with a twin-screw vented extruder, and this makes it possible not only to appropriately set the residence time of the reaction solution but also to lower the temperature thanks to suppression of shear heat generation, whereby a polycarbonate with a more improved color tone and excellent mechanical properties can be obtained.

Incidentally, the horizontal stirring reactor is a device having a horizontal shaft and mutually discontinuous stirring blades attached almost perpendicularly to the horizontal shaft and unlike an extrude, does not have a screw part. In the production method of the present invention, it is preferred to use at least one such horizontal stirring reactor.

In this embodiment, after the internal temperature and pressure of each of four reactors in the continuous production apparatus shown in FIG. 1 have reached predetermined values, a molten mixture of raw materials and a catalyst are continuously fed through a preheater, and melt polycondensation based on a transesterification reaction is started.

Therefore, the average residence time of the polymerization reaction solution in each reactor becomes equal to that in stationary operation immediately after the start of melt polycondensation. As a result, the polymerization reaction solution is not subject to a higher heat history than necessary, and an extraneous material such as gel and burn deposit produced in the obtained polycarbonate is decreased. The color tone is also improved.

The molecular weight of the polycarbonate of the present invention obtained by performing polycondensation in this way can be expressed by a reduced viscosity. The reduced viscosity is preferably 0.20 dL/g or more, more preferably 0.30 dL/g or more, and on the other hand, is preferably 1.20 dL/g or less, more preferably 1.00 dL/g or less, more preferably 0.80 dL/g or less.

If the reduced viscosity of the polycarbonate is too low, the mechanical strength of the molded article may be decreased, whereas if the reduced viscosity is too high, the flowability at the molding tends to lower, reducing the productivity and moldability. Incidentally, the reduced viscosity above is a value determined by preparing a solution having a polycarbonate concentration precisely adjusted to 0.6 g/dL with use of methylene chloride as a solvent and measuring the viscosity by means of an Ubbelohde viscosity tube at a temperature of 20.0° C.±0.1° C.

By the production method of the present invention, despite a polycarbonate having a structure of formula (1), a resin with less coloration and a small number of extraneous matters is obtained. Specifically, the number of extraneous matters with a maximum length of 20 pin or more, which are contained in a film having a thickness of 30 μm±5 μm formed using the polycarbonate resin of the present invention, can be reduced to preferably 1,000 pieces/$m^2$ or less, more preferably 500 pieces/$m^2$ or less, and most preferably 200 pieces/$m^2$ or less.

Incidentally, the term "film" generally indicates a thin flat product in which the thickness is extremely small as compared with the length and width and the maximum thickness is arbitrarily limited and which is usually supplied in the form of a roll, and the term "sheet" generally indicates, in accordance with the definition by JIS, a thin flat product in which the thickness is small for the length and width. However, the boundary between sheet and film is uncertain and since these two members need not be distinguished by word in the present invention, the term "film" referred to in the description of the present invention is used as a concept encompassing "sheet".

The polycarbonate of the present invention can be formed into a molded matter by a commonly known method such as injection molding method, extrusion molding method and compression molding method. The molding method of the polycarbonate is not particularly limited, but an appropriate molding method is selected according to the shape of the molded article. In the case where the molded article has a film or sheet form, an extrusion molding method is preferred. In the injection molding method, a degree of freedom of the molded article is obtained.

In the polycarbonate of the present invention, before performing various moldings, an additive such as heat stabilizer, neutralizer, ultraviolet absorber, release agent, coloring agent, antistatic agent, slip agent, lubricant, plasticizer, compatibilizer and flame retardant can be mixed, if desired, by using a tumbler, a supermixer, a floater, a V-blender, a Nauta mixer, a Banbury mixer, an extruder or the like.

Furthermore, the polycarbonate of the present invention can be also used as a polymer alloy, for example, by kneading it with one member or two or more members of a synthetic resin such as aromatic polycarbonate, aromatic polyester, aliphatic polyester, polyamide, polystyrene, polyolefin, acryl, amorphous polyolefin, ABS and AS, a biodegradable resin such as polylactic acid and polybutylene succinate, and rubber.

<Raw Material and Catalyst>

The raw material and catalyst which can be used for the polycarbonate of the present invention are described below.

(Dihydroxy Compound)

The dihydroxy compound for use in the production of the polycarbonate of the present invention contains a specific dihydroxy compound having a moiety represented by formula (1). Examples of the specific dihydroxy compound having a moiety represented by formula (1) in a part of the structure specifically include oxyalkylene glycols, dihydroxy compounds having, in the main chain, an ether group bonded to an aromatic group, and dihydroxy compounds having a cyclic ether structure.

Examples of the oxyalkylene glycols include diethylene glycol, triethylene glycol, tetraethylene glycol, polyethylene glycol, and polypropylene glycol.

Examples of the dihydroxy compounds having, in the main chain, an ether group bonded to an aromatic group include 9,9-bis[4-(2-hydroxyethoxy)phenyl]fluorene, 9,9-bis[4-(2-hydroxypropoxy)phenyl]fluorene, 9,9-bis[4-(2-hydroxyethoxy)-3-methylphenyl]fluorene, 9,9-bis[4-(2-hydroxypropoxy)-3-methylphenyl]fluorene, 9,9-bis[4-(2-hydroxyethoxy)-3-isopropylphenyl]fluorene, 9,9-bis[4-(2-hydroxyethoxy)-3-isobutylphenyl]fluorene, 9,9-bis[4-(2-hydroxyethoxy)-3-tert-butylphenyl]fluorene, 9,9-bis[4-(2-hydroxyethoxy)-3-cyclohexylphenyl]fluorene, 9,9-bis[4-(2-hydroxyethoxy)-3-phenylphenyl]fluorene, 9,9-bis[4-(2-hydroxyethoxy)-3,5-dimethylphenyl]fluorene, 9,9-bis[4-(2-hydroxyethoxy)-3-tert-butyl-6-methylphenyl]fluorene, 9,9-bis[4-(3-hydroxy-2,2-dimethylpropoxy)phenyl]fluorene, 2,2-bis[4-(2-hydroxyethoxy)phenyl]propane, 2,2-bis[4-(2-hydroxypropoxy)phenyl]propane, 1,3-bis(2-hydroxyethoxy) benzene, 4,4'-bis(2-hydroxyethoxy)biphenyl, and bis[4-(2-hydroxyethoxy)phenyl]sulfone.

Examples of the dihydroxy compounds having a cyclic ether structure include a dihydroxy compound represented by the following formula (6) and spiroglycols represented by the following formulae (13) and (14).

Incidentally, the "cyclic ether structure" of the "dihydroxy compound having a cyclic ether structure" means that the compound is composed of a structure having an ether group in a cyclic structure, where the carbon constituting the cyclic chain is an aliphatic carbon.

[Chem. 11]

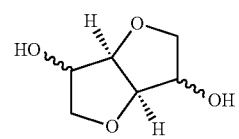

(6)

[Chem. 12]

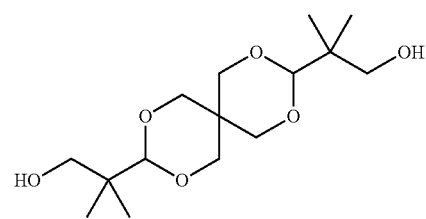

(13)

[Chem. 13]

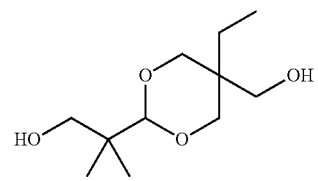

(14)

Examples of the dihydroxy compound represented by formula (6) include isosorbide (ISB), isomannide, and isoidide, which are in a stereoisomeric relationship. One of these compounds may be used alone, or two or more thereof may be used in combination.

Among these specific dihydroxy compounds, in view of ease of availability, handling, reactivity during polymerization, and hue of the obtained polycarbonate, a dihydroxy compound having a cyclic ether structure, typified by dihydroxy compounds represented by formulae (6), (13) and (14), are preferred; a dihydroxy compound represented by formula (6) and a dihydroxy compound having two cyclic ether structures, such as spiroglycol represented by the following formula (13), are more preferred; and an anhydrous sugar alcohol that is a dihydroxy compound having two sugar-derived cyclic ether structures, such as dihydroxy compound represented by formula (6), is still more preferred.

Of these specific dihydroxy compounds, use of a specific dihydroxy compound having no aromatic ring structure is preferred in view of light resistance of the polycarbonate. Among others, an anhydrous sugar alcohol such as dihydroxy compound represented by formula (6), which is obtained by dehydration condensation of sorbitol produced from various starches existing abundantly as a plant-derived resource and being easily available, is most preferred from the aspect of ease of availability and production, light resistance, optical properties, moldability, heat resistance and carbon neutrality.

One of these specific compounds may be used alone, or two or more thereof may be used in combination, according to the performance required of the obtained polycarbonate.

The polycarbonate of the present invention may contain a structural unit derived from a dihydroxy compound (hereinafter, sometimes referred to as "other dihydroxy compounds") other than the specific dihydroxy compound described above. Examples of the other dihydroxy compound include a dihydroxy compound of a linear aliphatic hydrocarbon, a dihydroxy compound of a linearly branched aliphatic hydrocarbon, a dihydroxy compound of an alicyclic hydrocarbon, and aromatic bisphenols.

Examples of the dihydroxy compound of a linear aliphatic hydrocarbon include ethylene glycol, 1,3-propanediol, 1,2-propanediol, 1,4-butanediol, 1,3-butanediol, 1,2-butanediol, 1,5-heptanediol, 1,6-hexanediol, 1,10-decanediol, and 1,12-dodecanediol.

Examples of the dihydroxy compound of a linearly branched aliphatic hydrocarbon include neopentyl glycol and hexylene glycol.

Examples of the dihydroxy compound of an alicyclic hydrocarbon include 1,2-cyclohexanediol, 1,2-cyclohexanedimethanol, 1,3-cyclohexanedimethanol, 1,4-cyclohexanedimethanol, tricyclodecanedimethanol, pentacyclopentadecanedimethanol, 2,6-decalindimethanol, 1,5-decalindimethanol, 2,3-decalindimethanol, 2,3-norbornanedimethanol, 2,5-norbornanedimethanol, 1,3-adamantanedimethanol, and a dihydroxy compound derived from a terpene compound such as limonene.

Examples of the aromatic bisphenols include 2,2-bis(4-hydroxyphenyl)propane, 2,2-bis(4-hydroxy-3,5-dimethylphenyl)propane, 2,2-bis(4-hydroxy-3,5-diethylphenyl) propane, 2,2-bis(4-hydroxy-(3,5-diphenyl)phenyl)propane, 2,2-bis(4-hydroxy-3,5-dibromophenyl)propane, 2,2-bis(4-hydroxyphenyl)pentane, 2,4'-dihydroxy-diphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenylsulfone, bis(4-hydroxyphenyl)sulfide, 4,4'-dihydroxydiphenyl ether, 4,4'-dihydroxy-3,3'-dichlorodiphenyl ether, 9,9-bis(4-(2-hydroxyethoxy-2-methyl) phenyl)fluorene, 9,9-bis(4-hydroxyphenyl)fluorene, and 9,9-bis(4-hydroxy-2-methylphenyl)fluorene.

In accordance with the performance required of the obtained polycarbonate, one of these other dihydroxy compounds may be used alone in combination with the specific dihydroxy compound, or two or more thereof may be combined and used in combination with the specific dihydroxy compound. Among others, in view of light resistance of the polycarbonate, a dihydroxy compound having no aromatic ring structure in the molecular structure, that is, a dihydroxy compound of an aliphatic hydrocarbon or a dihydroxy compound of an alicyclic hydrocarbon, is preferred, and these compounds may be also used in combination.

Of these compounds described above, the dihydroxy compound of an aliphatic hydrocarbon, which is suitable for light resistance, is preferably, among others, a dihydroxy compound of a linear aliphatic hydrocarbon having a carbon number of 3 to 6 and having a hydroxy group at both terminals, such as 1,3-propanediol, 1,4-butanediol, 1,5-heptanediol and 1,6-hexanediol.

The dihydroxy compound of an alicyclic hydrocarbon is preferably, among others, 1,2-cyclohexanedimethanol, 1,3-cyclohexanedimethanol, 1,4-cyclohexanedimethanol or tricyclodecanedimethanol, more preferably a dihydroxy compound having a cyclohexane structure, such as 1,2-cyclohexanedimethanol, 1,3-cyclohexanedimethanol and 1,4-cyclohexanedimethanol, and most preferably 1,4-cyclohexanedimethanol.

By using these other dihydroxy compounds in combination with the specific dihydroxy compound, an effect of, for example, enhancing the flexibility of the polycarbonate, increasing the heat resistance and improving the moldability may be also obtained.

However, if the content ratio of a structural unit derived from the other dihydroxy compound is too large, reduction in the mechanical properties or reduction in the heat resistance may result. Accordingly, the ratio of the structural unit derived from the other dihydroxy compound is, based on the molar number of structural units derived from all dihydroxy compounds, preferably 80 mol % or less, more preferably 70 mol % or less, still more preferably 60 mol % or less, and on the other hand, preferably 10 mol % or more, more preferably 15 mol % or more, still more preferably 20 mol % or more.

All dihydroxy compounds of the present invention may contain a stabilizer such as reducing agent, antioxidant, deoxidizer, light stabilizer, antacid, pH stabilizer and heat stabilizer. In particular, the specific dihydroxy compound of the present invention is susceptible to change in quality under acidic conditions and therefore, it is preferred to contain a basic stabilizer.

Examples of the basic stabilizer include hydroxides, carbonates, phosphates, phosphites, hypophosphites, borates and fatty acid salts of metals belonging to Group 1 or Group 2 of the long-form periodic table (Nomenclature of Inorganic Chemistry IUPAC Recommendations 2005); a basic ammonium compound such as tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide and butyltriphenylammonium hydroxide; an amine-based compound such as diethylamine, dibutylamine, triethylamine, morpholine, N-methylmorpholine, pyrrolidine, piperidine, 3-amino-1-propanol, ethylenediamine, N-methyldiethanolamine, diethylethanolamine, 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole and aminoquinoline; and a hindered amine-based compound such as di-(tert-butyl)amine and 2,2,6,6-tetramethylpiperidine. Among these stabilizers, in view of the stabilization effect, tetramethylammonium hydroxide, imidazole, and a hindered amine-based compound are preferred.

The content of the basic stabilizer in all dihydroxy compounds used in the present invention is not particularly limited, but the specific dihydroxy compound for use in the present invention is unstable in the acidic state and therefore, the stabilizer is preferably added such that an aqueous solution of the specific dihydroxy compound containing the stabilizer has a pH of 7 or more.

If the content is too small, the effect of preventing the specific dihydroxy compound of the present invention from changing in quality may not be obtained, whereas if the content is too large, alteration of the specific dihydroxy compound of the present invention may be caused. For these reasons, the content is preferably from 0.0001 to 1 wt %, more preferably from 0.001 to 0.1 wt %, based on each dihydroxy compound for use in the present invention.

If the dihydroxy compound of the present invention still containing the basic stabilizer is used as a raw material for the production of a polycarbonate, not only the basic stabilizer itself works out to a polymerization catalyst, making it difficult to control the polymerization rate or quality, but also the hue of the resin is impaired.

Therefore, out of the specific dihydroxy compound and other dihydroxy compounds, a dihydroxy compound containing a basic stabilizer is preferably subjected to removal of the basic stabilizer by an ion exchange resin, distillation or the like before using the compound as a raw material for the production of a polycarbonate.

Also, the specific dihydroxy compound for use in the present invention is likely to be gradually oxidized by oxygen and therefore, at the handling during storage or production, it is preferred to avoid inclusion of water, use a deoxidizer or the like, or create a nitrogen atmosphere and thereby prevent an oxygen-induced decomposition.

When isosorbide is oxidized, a decomposition product including formic acid is generated. For example, if a polycarbonate is produced using isosorbide containing such a decomposition product, the decomposition product may disadvantageously not only cause coloration of the obtained polycarbonate or significant deterioration of the physical properties but also affect the polymerization reaction, leading to a failure in obtaining a polymer having a high molecular weight.

In order to obtain the specific dihydroxy compound free from the oxidative decomposition product or remove the basic stabilizer, distillation purification is preferably performed. The distillation here may be simple distillation or continuous distillation and is not particularly limited.

As to the distillation conditions, distillation is preferably performed under reduced pressure in an inert gas atmosphere such as argon or nitrogen and in order to inhibit thermal alteration, is preferably performed under the condition of 250° C. or less, more preferably 200° C. or less, still more preferably 180° C. or less.

Thanks to such distillation purification, when dihydroxy compounds containing the specific dihydroxy compound are used as a raw material for polycarbonate production, a polycarbonate excellent in the hue and thermal stability can be produced without impairing the polymerization reactivity.
(Carbonic Acid Diester)

The polycarbonate of the present invention can be obtained by using, as raw materials, dihydroxy compounds containing the specific dihydroxy compound and a carbonic acid diester and subjecting the raw materials to polycondensation by a transesterification reaction.

The carbonic acid diester used includes usually those represented by the following formula (15). One of these carbonic acid diesters may be used alone, or two or more thereof may be mixed and used.

[Chem. 14]

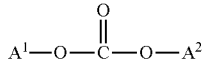

(15)

In formula (15), each of $A^1$ and $A^2$ is a substituted or unsubstituted aliphatic hydrocarbon group having a carbon number of 1 to 18 or an substituted or unsubstituted aromatic hydrocarbon group, and $A^1$ and $A^2$ may be the same or different. Each of $A^1$ and $A^2$ is preferably a substituted or unsubstituted aromatic hydrocarbon group, more preferably an unsubstituted aromatic hydrocarbon group.

Examples of the carbonic acid diester represented by formula (15) include diphenyl carbonate (DPC), a substituted diphenyl carbonate such as ditolyl carbonate, dimethyl carbonate, diethyl carbonate, and di-t-butyl carbonate. Among these, diphenyl carbonate and a substituted diphenyl carbonate are preferred, and diphenyl carbonate is more preferred.

Incidentally, the carbonic acid diester sometimes contains impurities such as chloride ion, and the impurities may inhibit the polymerization reaction or worsen the hue of the polycarbonate obtained. Therefore, a carbonic acid diester purified by distillation or the like is preferably used, as needed.
(Transesterification Reaction Catalyst)

The polycarbonate of the present invention is produced, as described above, by a transesterification reaction of dihydroxy compounds containing the specific dihydroxy compound and a carbonic acid diester represented by formula (15). In more detail, the polycarbonate is obtained by causing a transesterification reaction and removing a monohydroxy compound and the like occurring as a byproduct out of the system.

At the transesterification reaction, polycondensation is performed in the presence of a transesterification reaction catalyst, and the transesterification reaction catalyst (hereinafter, sometimes simply referred to as catalyst or polymerization catalyst) usable at the production of the polycarbonate of the present invention can exert a very great effect on the reaction rate or the color tone of the polycarbonate obtained by polycondensation.

The catalyst used is not limited so long as the transparency, hue, heat resistance, thermal stability and mechanical strength of the polycarbonate produced can be satisfied. Examples of the catalyst include a compound of a metal belonging to Group 1 or Group 2 of the long-form periodic table (hereinafter, simply referred to as "Group 1" or "Group 2"), and a basic compound such as basic boron compound, basic phosphorus compound, basic ammonium compound and amine-based compound. A Group 1 metal compound and/or a Group 2 metal compound are preferably used.

Examples of the Group 1 metal compound include sodium hydroxide, potassium hydroxide, lithium hydroxide, cesium hydroxide, sodium hydrogencarbonate, potassium hydrogencarbonate, lithium hydrogencarbonate, cesium hydrogencarbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium borohydride, potassium borohydride, lithium borohydride, cesium borohydride, sodium borophenylate, potassium borophenylate, lithium borophenylate, cesium borophenylate, sodium benzoate, potassium benzoate, lithium benzoate, cesium benzoate, disodium hydrogenphosphate, dipotassium hydrogenphosphate, dilithium hydrogenphosphate, dicesium hydrogenphosphate, disodium phenylphosphate, dipotassium phenylphosphate, dilithium phenylphosphate, dicesium phenylphosphate, alcoholates and phenolates of sodium, potassium, lithium and cesium, and disodium, dipotassium, dilithium and dicesium salts of bisphenol A. Among these, a lithium compound is preferred in view of polymerization activity and hue of the polycarbonate obtained.

Examples of the Group 2 metal compound include calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. Among these, a magnesium compound, a calcium compound and a barium compound are preferred; a magnesium compound and/or a calcium compound are more preferred in view of polymerization activity and hue of the obtained polycarbonate; and a calcium compound is most preferred.

Incidentally, together with the Group 1 metal compound and/or the Group 2 metal compound, a basic compound such as basic boron compound, basic phosphorus compound, basic ammonium compound and amine-based compound may be secondarily used in combination, but it is particularly preferred to use only the Group 1 metal compound and/or the Group 2 metal compound.

Examples of the basic phosphorus compound include triethylphosphine, tri-n-propylphosphine, triisopropylphosphine, tri-n-butylphosphine, triphenylphosphine, tributylphosphine, and a quaternary phosphonium salt.

Examples of the basic ammonium compound include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

Examples of the amine-based compound include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, aminoquinoline, and guanidine.

The amount of the polymerization catalyst used is preferably from 0.1 to 300 μmol, more preferably from 0.5 to 100 μmol, per mol of all dihydroxy compounds used for polymerization.

Above all, in the case of using a compound containing at least one metal selected from the group consisting of metals belonging to Group 2 of the long-form periodic table and lithium, particularly, in the case of using a magnesium compound and/or a calcium compound, the amount of the catalyst used is, in terms of the metal amount, preferably 0.1 μmol or more, more preferably 0.3 μmol or more, still more preferably 0.5 μmol or more, per mol of all dihydroxy compounds above. The upper limit thereof is preferably 20 mol or less, more preferably 10 μmol or less, still more preferably 3 μmol or less, yet still more preferably 1.5 mol or less.

If the amount of the catalyst is too small, the polymerization rate is slowed down and for obtaining a polycarbonate having a desired molecular weight, the polymerization temperature must be raised to make up for it. As a result, the hue of the polycarbonate obtained is highly likely to be worsened, or an unreacted raw material may be volatilized halfway through the polymerization to disrupt the molar ratio of a dihydroxy compound and a carbonic acid diester, failing in reaching the desired molecular weight might. On the other hand, if the amount of the polymerization catalyst used is too large, an undesirable side reaction may occur in combination to worsen the hue of the obtained polycarbonate or cause coloration of the resin during molding.

However, out of Group 1 metals, sodium, potassium or cesium when contained in a large amount in the polycarbonate may adversely affect the hue. Such a metal may migrate not only from the catalyst used but also from the raw material or the reaction apparatus.

Irrespective of the source, the total amount of these metal compounds in the polycarbonate is, in terms of metal amount, preferably 2 mol or less, more preferably 1 μmol or less, still more preferably 0.5 μmol or less, per mol of all dihydroxy compounds above.

EXAMPLES

The present invention is described in greater detail below by referring to Examples, but the present invention is not limited to these Examples as long as the purport thereof is observed. Incidentally, values for various production conditions or evaluation results in the following Examples have a meaning as a preferred value of the upper or lower limit in the embodiment of the present invention, and the preferred range may be a range defined by a combination of the above-described upper or lower limit value and the value in the following Example or a combination of values in Examples.

Abbreviations of compounds used in Examples are as follows.

ISB: Isosorbide [trade name: POLYSORB, produced by Roquette Frères]

CHDM: 1,4-Cyclohexanedimethanol [trade name: SKY CHDM, produced by New Japan Chemical Co., Ltd.]

DPC: Diphenyl carbonate [produced by Mitsubishi Chemical Corp.]

The compositional analysis and evaluation of physical properties of the reaction solution, liquid distillate and polycarbonate were performed by the following methods.

1) Monohydroxy Compound (Phenol) Content in Reaction Solution

About 0.5 g of a sample was precisely weighed and dissolved in 5 ml of methylene chloride, and acetone was added thereto to make a total amount of 25 ml. This solution was filtered through a 0.2 μm disc filter and after quantitatively determining phenol by liquid chromatography, the content was calculated. The apparatus and conditions used are as follows.

Apparatus:
 Manufactured by Shimadzu Corp.
 System controller: CBM-20A
 Pump: LC-10AD
 Column oven: CTO-10ASvp
 Detector: SPD-M20A
 Analysis column: Cadenza CD-18, 4.6 mmΦ×250 mm
 Oven temperature: 40° C.
Detector wavelength: 260 nm
Eluent:
 Solution A: an aqueous 0.1% phosphoric acid solution;
 Solution B: acetonitrile; a 10 minutes gradient from A/B=40/60 (vol %) to A/B=0/100 (vol %)
 Flow rate: 1 mL/min
 Sample injection amount: 10 μL 2) Measurement of Amount of All Hydroxy Terminal Groups and Amount of Double Bond Terminal Group in Polycarbonate First, 30 mg of polycarbonate was weighed and dissolved in about 0.7 mL of deuterochloroform, and the resulting solution was put in a tube for NMR having an internal diameter of 5 mm and measured for the $^1$H NMR spectrum. Using the ratio of signal intensities based on hydroxy terminal group and double bond terminal group derived from each dihydroxy compound constituting the polycarbonate and structural units derived from respective hydroxy compounds, the amounts of all hydroxy terminal groups and double bond terminal groups were determined. The apparatus and conditions used are as follows.

Apparatus:
JNM-AL400, manufactured by JEOL Ltd. (resonant frequency: 400 MHz)
Measurement temperature: ordinary temperature
Relaxation time: 6 seconds
Number of integrations: 512

The analysis of $^1$H NMR in the case of a copolymerized carbonate of ISB and CHDM exemplified in the present invention is performed as follows. The integrated value of the following peaks is calculated.

(a): 5.6-4.8 ppm: derived from all ISB structural units (proton number: 3, molecular weight: 172.14)

(b): 2.2-0.5 ppm: derived from all CHDM structural units (proton number: 10, molecular weight: 170.21)

(c): 4.4 ppm: derived from hydroxy terminal group of ISB (proton number: 1, molecular weight: 173.14)

(d): 3.6-3.5 ppm: derived from hydroxy terminal group of ISB (proton number: 1, molecular weight: 173.14) and derived from hydroxy terminal group of CHDM (proton number: 2, molecular weight: 171.21)

(e): 3.5-3.4 ppm: derived from hydroxy terminal group of CHDM (proton number: 2, molecular weight: 171.21) and derived from double bond terminal group of ISB (proton number: 1, molecular weight: 155.13)

(f): 2.6 ppm: derived from hydroxy terminal group of ISB (proton number: 1, molecular weight: 173.14)

(g): 6.7-6.5 ppm: derived from double bond terminal group of ISB (proton number: 1, molecular weight: 155.13)

(h): 2.3 ppm: derived from double bond terminal group of CHDM (proton number: 2, molecular weight: 153.20)

Value Corresponding to Molar Number of Each Structure:
All ISB structural units:

($a$) integrated value/3=($a'$)

All CHDM structural units:

($b$) integrated value/10=($b'$)

Hydroxy terminal group of ISB:

($c$) integrated value+($f$) integrated value=($c'$)

Hydroxy terminal group of CHDM:

{($d$) integrated value−($f$) integrated value}/2+{($e$) integrated value−($g$) integrated value)}/2=($d'$)

Double bond terminal group of ISB:

($g$) integrated value=($e'$)

Double bond terminal group of CHDM:

($h$) integrated value/2=($f'$)

Amount of Each Terminal Group (unit: mol/ton):
Amount of hydroxy terminal group of ISB:

($c'$)/($g'$)×1,000,000

Amount of hydroxy terminal group of CHDM:

($\delta'$)/($g'$)×1,000,000

Amount of double bond terminal group of ISB:

($e'$)/($g'$)×1,000,000

Amount of double bond terminal group of CHDM:

($f'$)/($g'$)×1,000,000

Here, ($g'$)=($a'$)×172.14+($b$)×170.21.

3) Reduced Viscosity

A polycarbonate resin solution having a concentration of 0.6 g/dL was prepared using methylene chloride as a solvent and measured at a temperature of 20.0° C.±0.1° C. by using an Ubbelohde viscosity tube manufactured by Moritomo Rika Kogyo, and the relative viscosity $\eta_{rel}$ was determined from the flow-through time $t_0$ of the solvent and the flow-through time t of the solution according to the following formula:

$$\eta_{rel}=t/t_0$$

The specific viscosity $\eta_{sp}$ was determined from the relative viscosity according to the following formula:

$$\eta_{sp}=(\eta-\eta_0)/\eta_0=\eta_{rel}-1$$

The reduced viscosity $\eta_{sp}/c$ was determined by dividing the specific viscosity by the concentration C (g/dL). A higher value indicates a larger molecular weight.

4) Pellet YI Value of Polycarbonate

The hue of the polycarbonate was evaluated by measuring the YI value (Yellow Index value) in reflected light from the pellet in accordance with ASTM D1925. As the apparatus, a spectrophotometer, CM-5, manufactured by Konica Minolta, Inc. was used, and as for the measurement conditions, a measurement diameter of 30 mm and SCE were selected. A calibration glass CM-A212 for petri dish measurement was set in the measurement part, and zero calibration was performed by superposing a zero calibration box CM-A124 thereon. Subsequently, white calibration was performed using a white calibration plate.

The measurement was performed using a white calibration plate CM-A210, and it was confirmed that L* was 99.40±0.05, a* was 0.03±0.01, b* was −0.43±0.01, and YI was −0.58±0.01. The measurement of the pellet was performed by filling a cylindrical glass vessel having an internal diameter of 30 mm and a height of 50 mm with pellets to a depth of about 40 mm. An operation of taking out the pellets from the glass vessel and again performing the measurement was repeated two times, and an average value of three measurements in total was used. A smaller YI value means that the yellow tint of the resin is lessened and the color tone is better.

5) Quantitative Determination of Extraneous Matter in Polycarbonate Resin

Temperatures of barrels of a 20 mm-diameter single-screw extruder with a T-die were set to 210° C., 220° C., 230° C., 230° C. and 220° C. from the pellet feed side, and a film having a thickness of 30 μm±5 μm was formed using a cooling roll and measured for the number of extraneous matters of 25 μm or more, per 1 m$^2$ by using Film Quality Testing System (Model FSA100) manufactured by Optical Control System. A polycarbonate pellet was sampled every three hours during 24-hour running, and an average value of eight measurements was used.

6) Measurement of Melt Viscosity

A sample vacuum-dried at 80° C. for 5 hours was measured by a capillary rheometer [manufactured by Toyo Seiki Ltd.]. The sample was heated to the same temperature as the reaction temperature and measured for the melt viscosity at a shear rate of 9.12 to 1,824 sec$^{-1}$, and the value of melt viscosity at 91.2 sec$^{-1}$ was used. An orifice having a die diameter of 1 mmϕ×40 mL was used for the sample at the outlet of the third vertical stirring reactor, and an orifice having a die diameter of 1 mmϕ×10 mL was used for the sample at the outlet of the fourth horizontal stirring reactor.

Example 1

A polycarbonate was produced under the following conditions by using a continuous production apparatus having, as shown in FIG. 1 three vertical stirring reactors and one horizontal stirring reactor. First, as shown in Table-1, each reactor was previously set to an internal temperature and a pressure according to the reaction conditions. Separately, in the raw material preparation process, ISB, CHDM and DPC were mixed in a given molar ratio (ISB/CHDM/DPC=0.500/0.500/1.010) in a nitrogen atmosphere and heated at 120° C. to obtain a molten mixture of raw materials.

TABLE 1

|  | Temperature (° C.) | Pressure (kPa) | Average Residence Time (min) |
| --- | --- | --- | --- |
| First vertical stirring reactor | 195 | 26.7 | 80 |
| Second vertical stirring reactor | 195 | 20.0 | 45 |
| Third vertical stirring reactor | 215 | 7.5 | 30 |
| Fourth vertical stirring reactor | 230 | 0.1 | 90 |

Subsequently, the molten mixture of raw materials was continuously fed into the first vertical stirring reactor 6a controlled to fall in ±5% of the predetermined temperature and the predetermined pressure, through a raw material introduction tube heated at 140° C., and while controlling the degree of opening of a valve (not shown) provided in a polymer discharge line at the bottom to give an average residence time of 80 minutes, the liquid level was kept constant. Simultaneously with the start of feeding of the molten mixture of raw materials, an aqueous calcium acetate solution as a catalyst was continuously fed into the first vertical stirring reactor 6a from the catalyst feed port 1d at a ratio of 1.5 μmol per mol of all dihydroxy ingredients.

Subsequently, the polymerization reaction solution discharged from the bottom of the first vertical stirring reactor 6a was continuously fed in sequence to the second vertical stirring reactor 6b, to the third vertical stirring reactor 6c, and to the fourth horizontal stirring reactor 6d (two-shaft spectacle-shaped blade, L/D=4). During the polymerization reaction, the liquid level of each reactor was controlled to give the average residence time shown in Table-1. The volume of the fourth horizontal stirring reactor 6d was 250 L, and the temperature of the heating medium was 230° C. The reaction solution was fed at a throughput of 50 kg/hr.

The third vertical stirring reactor corresponds to a penultimate reactor prior to the final polymerization reactor. That is, the internal temperature of the penultimate reactor prior to the final polymerization reactor was 215° C. The reaction conditions were adjusted such that the reduced viscosity at the outlet of the fourth horizontal stirring reactor 6d falls in the range of 0.68 to 0.70, as a result, the pressure was 0.3 kPa and the average residence time was 90 minutes. The rotation speed of the stirring shaft was set to 3 rpm.

The reaction solution withdrawn from the fourth horizontal stirring reactor 6d was transferred by a gear pump 4c to an extruder 15a. The extruder [twin-screw extruder LABOTEX 30HSS-32, manufactured by The Japan Steel Works, Ltd., L/D=32} has two vent openings, and devolatilization was performed from the vent openings by using a vacuum pump. At this time, the pressure in the vent part was 1 kPa or less in terms of absolute pressure.

A gear pump 4c was disposed on the resin discharge side of the extruder 16d, and further downstream thereof, a polymer filter 15b where 10 leaf disc filters each having an external diameter of 112 mm, an internal diameter of 38 mm and a 99% filtration accuracy of 20 μm [manufactured by Pall Corporation] were fixed inside a containment vessel, was disposed. A die for stand formation was fixed on the discharge side of the polymer filter.

The resin discharged was water-cooled and solidified in strand form and pelletized by a rotary cutter. The process from stand formation to pelletization was performed in a clean room. Subsequently, the pellet was pneumatically transported and thereby delivered to a product hopper 16d.

During the production of a polycarbonate, the reaction solution corresponding to the outlet of the penultimate reactor prior to the final polymerization reactor was sampled from a valve fixed after a gear pump 4b, the reaction solution corresponding to the outlet of the final polymerization reactor was sampled from a valve fixed after a gear pump 4c, the polycarbonate pellet was sampled after a strand cutter 16b, and each sample was subjected to various analyses by the above-described analysis methods.

When a 24-hour running was performed under these reaction conditions, the number of incidences of the strand being broken and pelletization being stopped was one time in 24 hours. These results are shown together in Table-2.

Example 2

The internal temperature of the third vertical stirring reactor 6c was set to 210° C., and the average residence time therein was set to 15 minutes, whereby the molecular weight and melt viscosity at the outlet of the third vertical stirring reactor 6c were made lower than those in Example 1. Similarly to Example 1, the conditions of the fourth horizontal stirring reactor 6d were adjusted such that the reduced viscosity at the outlet of the fourth horizontal stirring reactor 6d fall in the range of 0.68 to 0.70, as a result, the pressure was 0.2 kPa and the average residence time was 120 minutes. Items not referred to here were performed in the same manner as in Example 1.

The reaction time in the fourth horizontal stirring reactor where the temperature becomes highest out of reactors was prolonged and therefore, the color tone of the obtained polycarbonate was slightly worsened as compared with Example 1, but the content of a monohydroxy compound was low and the amount of extraneous matters was very small.

Example 3

The charge molar ratio of raw materials was set to ISB/CHDM/DPC=0.500/0.500/0.995. The conditions of the fourth horizontal stirring reactor 6d were in the same manner as in Example 1, as a result, the pressure was 1.0 kPa and the average residence time was 90 minutes. Items not referred to here were performed in the same manner as in Example 1.

The amounts of hydroxy terminal and phenyl carbonate terminal were balanced and therefore, a high increasing rate of the molecular weight and a high pressure were brought about in the fourth horizontal reactor, leading to an increased content of a monohydroxy compound in the polycarbonate, but the pellet YI was low and the color tone was good.

Example 4

This Example was performed in the same manner as in Example 1 except that the stirring rotation speed of the fourth horizontal stirring reactor 6d was changed to 7 rpm. Because of the resulting situation where the reaction solution twined around the stirring shaft and could hardly run down to the outlet of the reactor, the pelletization process stopped 12 times in 24-hour running and the amount of an extraneous matter in the polycarbonate pellet obtained was increased, but the pellet YI was low and the color tone was good.

Example 5

This Example was performed in the same manner as in Example 1 except that the stirring rotation speed of the fourth horizontal stirring reactor 6d was changed to 1 rpm.

The running could be stably continued, but the stirring efficiency was reduced as compared with Example 1 and therefore, the content of a monohydroxy compound in the obtained polycarbonate was increased, nevertheless, a low pellet YI and a good color tone were achieved and the amount of an extraneous matter was very small.

Example 6

The reaction was accelerated by setting the temperature of the third vertical stirring reactor 6c to 210° C. and reducing the temperature to 3 kPa, and the reaction was allowed to proceed until reaching the same level of the molecular weight as in Example 1. Furthermore, the stirring rotation speed of the fourth horizontal stirring reactor 6d was set to 1.5 rpm. Others were performed in the same manner as in Example 1.

The content of a monohydroxy compound and the amount of an extraneous matter in the polycarbonate were equal to those in Example 1, nevertheless, the pellet YI could be more enhanced.

Example 7

The charge molar ratio of raw materials was set to ISB/CHDM/DPC=0.700/0.300/1.01.

The reaction temperature, pressure and residence time were set in the same manner as in Example 1, and the reaction conditions were adjusted such that the reduced viscosity at the outlet of the fourth horizontal stirring reactor 6d falls in the range of 0.41 to 0.44.

A polycarbonate having good results in terms of the content of a monohydroxy compound and the amount of an extraneous matter in the polycarbonate as well as the color tone and quality of the polycarbonate, was obtained.

Example 8

The reaction was accelerated by setting the temperature of the third vertical stirring reactor 6c to 210° C. and reducing the temperature to 5 kPa, and the reaction was allowed to proceed until reaching the same level of the molecular weight as in Example 7. Furthermore, the stirring rotation speed of the fourth horizontal stirring reactor 6d was set to 1.5 rpm. Others were performed in the same manner as in Example 1. The content of a monohydroxy compound and the amount of an extraneous matter in the polycarbonate were equal to those in Example 7, nevertheless, the pellet YI could be more enhanced.

Comparative Example 1

The internal temperature of the third vertical stirring reactor 6c was raised to 230° C. The conditions of the fourth horizontal stirring reactor 6d were adjusted in the same manner as in Example 1, as a result, the pressure was 1.1 kPa and the average residence time was 80 minutes. Items not referred to here were performed in the same manner as in Example 1.

The color tone of the obtained polycarbonate was worsened as compared with Examples 1 to 6. Also, the content of a monohydroxy compound was increased as compared with Example 1.

Comparative Example 2

The internal temperature of the third vertical stirring reactor 6c was raised to 230° C. The conditions of the fourth horizontal stirring reactor 6d were adjusted in the same manner as in Example 6, as a result, the pressure was 0.8 kPa and the average residence time was 80 minutes. Items not referred to here were performed in the same manner as in Example 7.

The color tone of the obtained polycarbonate was worsened as compared with Examples 7 and 8. Also, the content of a monohydroxy compound was increased as compared with Example 7.

TABLE 2

|  |  | unit | Example 1 | Example 2 | Example 3 | Example 4 |
|---|---|---|---|---|---|---|
| Charge | ISB | mol % | 50 | 50 | 50 | 50 |
|  | CHDM | mol % | 50 | 50 | 50 | 50 |
|  | DPC/Dihydroxy Compound | — | 1.010 | 1.010 | 0.995 | 1.010 |
| First vertical stirring reactor | Internal temperature | ° C. | 195 | ← | ← | ← |
|  | Temperature of heating medium | ° C. | 217 | ← | ← | ← |
|  | Pressure | kPa | 26.7 | ← | ← | ← |
|  | Average residence time | min | 80 | ← | ← | ← |
| Second vertical stirring reactor | Internal temperature | ° C. | 195 | ← | ← | ← |
|  | Temperature of heating medium | ° C. | 211 | ← | ← | ← |
|  | Pressure | kPa | 20 | ← | ← | ← |
|  | Average residence time | min | 45 | ← | ← | ← |
| Third vertical stirring reactor | Internal temperature | ° C. | 215 | 210 | 215 | 215 |
|  | Temperature of heating medium | ° C. | 218 | 218 | 218 | 218 |
|  | Pressure | kPa | 7.5 | 7.5 | 7.5 | 7.5 |
|  | Average residence time | min | 30 | 15 | 30 | 30 |
| Outlet | Melt viscosity | Pa · s | 240 | 110 | 240 | 240 |
|  | Reduced viscosity (P) | dL/g | 0.357 | 0.280 | 0.361 | 0.355 |
|  | Amount of double bond terminal (X) | mol/ton | 3.5 | 2.5 | 3.4 | 3.3 |
|  | Content of monohydroxy compound | wt % | 1.49 | 2.10 | 1.53 | 1.39 |
| Fourth horizontal stirring reactor | Volume of horizontal reactor (V) | L | 250 | 250 | 250 | 250 |
|  | Throughput of reaction solution (A) | Kg/hr | 50 | 50 | 50 | 50 |
|  | Temperature of heating medium | ° C. | 230 | 230 | 230 | 230 |
|  | Pressure | kPa | 0.3 | 0.2 | 1.0 | 0.3 |

TABLE 2-continued

|  |  |  | unit | | | | |
|---|---|---|---|---|---|---|---|
|  | Outlet | Average residence time | min | 90 | 120 | 90 | 90 |
|  |  | Temperature | °C. | 225 | 225 | 227 | 225 |
|  |  | Melt viscosity (μ) | Pa·s | 3000 | 3000 | 3000 | 2900 |
|  |  | Reduced viscosity (Q) | dL/g | 0.692 | 0.688 | 0.692 | 0.694 |
|  |  | Amount of double bond terminal (Y) | mol/ton | 7.6 | 10.8 | 7.6 | 7.6 |
|  |  | Q/P | — | 1.94 | 2.46 | 1.92 | 1.95 |
|  |  | Y − X | mol/ton | 4.10 | 8.30 | 4.20 | 4.30 |
|  |  | V/A | — | 5.0 | 5.0 | 5.0 | 5.0 |
|  | Stirring shaft | Rotation speed (ω) | rpm | 3 | 3 | 3 | 7 |
|  |  | ωμ | — | 9000 | 9000 | 9000 | 20300 |
| Pelletization process | Number of stoppages of pelletization in 24 hours | | times | 1 | 0 | 1 | 12 |
| Polycarbonate | Amount of all hydroxy terminal groups | | mol/ton | 23 | 24 | 67 | 21 |
|  | Content of monohydroxy compound | | ppm | 440 | 330 | 1540 | 430 |
|  | Reduced viscosity | | dL/g | 0.688 | 0.679 | 0.685 | 0.686 |
|  | Pellet YI | | — | 9.2 | 12.1 | 10.0 | 9.4 |
|  | Amount of extraneous matter | | — | 146 | 130 | 201 | 2339 |

|  |  |  | unit | Example 1 | Example 5 | Example 6 | Example 7 |
|---|---|---|---|---|---|---|---|
| Charge |  | ISB | mol % | 50 | 50 | 50 | 70 |
|  |  | CHDM | mol % | 50 | 50 | 50 | 30 |
|  |  | DPC/Dihydroxy Compound | — | 1.010 | 1.010 | 1.010 | 1.010 |
| First vertical stirring reactor |  | Internal temperature | °C. | 195 | ← | ← | ← |
|  |  | Temperature of heating medium | °C. | 217 | ← | ← | ← |
|  |  | Pressure | kPa | 26.7 | ← | ← | ← |
|  |  | Average residence time | min | 80 | ← | ← | ← |
| Second vertical stirring reactor |  | Internal temperature | °C. | 195 | ← | ← | ← |
|  |  | Temperature of heating medium | °C. | 211 | ← | ← | ← |
|  |  | Pressure | kPa | 20 | ← | ← | ← |
|  |  | Average residence time | min | 45 | ← | ← | ← |
| Third vertical stirring reactor |  | Internal temperature | °C. | 215 | 215 | 210 | 215 |
|  |  | Temperature of heating medium | °C. | 218 | 218 | 215 | 218 |
|  |  | Pressure | kPa | 7.5 | 7.5 | 3.0 | 7.5 |
|  |  | Average residence time | min | 30 | 30 | 30 | 30 |
|  | Outlet | Melt viscosity | Pa·s | 240 | 240 | 270 | 250 |
|  |  | Reduced viscosity (P) | dL/g | 0.357 | 0.357 | 0.350 | 0.243 |
|  |  | Amount of double bond terminal (X) | mol/ton | 3.5 | 3.5 | 2.3 | 2.4 |
|  |  | Content of monohydroxy compound | wt % | 1.49 | 1.61 | 1.22 | 1.52 |
| Fourth horizontal stirring reactor |  | Volume of horizontal reactor (V) | L | 250 | 250 | 250 | 250 |
|  |  | Throughput of reaction solution (A) | Kg/hr | 50 | 50 | 50 | 50 |
|  |  | Temperature of heating medium | °C. | 230 | 230 | 230 | 230 |
|  |  | Pressure | kPa | 0.3 | 0.3 | 0.3 | 0.3 |
|  |  | Average residence time | min | 90 | 90 | 90 | 90 |
|  | Outlet | Temperature | °C. | 225 | 226 | 225 | 225 |
|  |  | Melt viscosity (μ) | Pa·s | 3000 | 3000 | 3000 | 2500 |
|  |  | Reduced viscosity (Q) | dL/g | 0.692 | 0.690 | 0.688 | 0.433 |
|  |  | Amount of double bond terminal (Y) | mol/ton | 7.6 | 7.6 | 5.3 | 5.1 |
|  |  | Q/P | — | 1.94 | 1.93 | 1.97 | 1.78 |
|  |  | Y − X | mol/ton | 4.10 | 4.10 | 3.00 | 2.70 |
|  |  | V/A | — | 5.0 | 5.0 | 5.0 | 5.0 |
|  | Stirring shaft | Rotation speed (ω) | rpm | 3 | 1 | 1.5 | 3 |
|  |  | ωμ | — | 9000 | 3000 | 4500 | 7500 |
| Pelletization process | Number of stoppages of pelletization in 24 hours | | times | 1 | 0 | 0 | 0 |
| Polycarbonate | Amount of all hydroxy terminal groups | | mol/ton | 23 | 21 | 18 | 20 |
|  | Content of monohydroxy compound | | ppm | 440 | 860 | 450 | 420 |
|  | Reduced viscosity | | dL/g | 0.688 | 0.685 | 0.690 | 0.441 |
|  | Pellet YI | | — | 9.2 | 9.6 | 7.8 | 10.5 |
|  | Amount of extraneous matter | | — | 146 | 133 | 111 | 120 |

|  |  |  | unit | Example 1 | Example 8 | Comparative Example 1 | Comparative Example 2 |
|---|---|---|---|---|---|---|---|
| Charge |  | ISB | mol % | 50 | 70 | 50 | 70 |
|  |  | CHDM | mol % | 50 | 30 | 50 | 30 |
|  |  | DPC/Dihydroxy Compound | — | 1.010 | 1.010 | 1.010 | 1.010 |
| First vertical stirring reactor |  | Internal temperature | °C. | 195 | ← | ← | ← |
|  |  | Temperature of heating medium | °C. | 217 | ← | ← | ← |
|  |  | Pressure | kPa | 26.7 | ← | ← | ← |
|  |  | Average residence time | min | 80 | ← | ← | ← |
| Second vertical stirring reactor |  | Internal temperature | °C. | 195 | ← | ← | ← |
|  |  | Temperature of heating medium | °C. | 211 | ← | ← | ← |
|  |  | Pressure | kPa | 20 | ← | ← | ← |
|  |  | Average residence time | min | 45 | ← | ← | ← |

TABLE 2-continued

| | | | | | | |
|---|---|---|---|---|---|---|
| Third vertical stirring reactor | Internal temperature | °C. | 215 | 210 | 230 | 230 |
| | Temperature of heating medium | °C. | 218 | 215 | 232 | 233 |
| | Pressure | kPa | 7.5 | 5.0 | 7.5 | 7.5 |
| | Average residence time | min | 30 | 30 | 30 | 30 |
| | Outlet Melt viscosity | Pa·s | 240 | 260 | 220 | 210 |
| | Reduced viscosity (P) | dL/g | 0.357 | 0.254 | 0.435 | 0.255 |
| | Amount of double bond terminal (X) | mol/ton | 3.5 | 2.0 | 5.9 | 4.1 |
| | Content of monohydroxy compound | wt % | 1.49 | 1.32 | 1.25 | 1.30 |
| Fourth horizontal stirring reactor | Volume of horizontal reactor (V) | L | 250 | 250 | 250 | 250 |
| | Throughput of reaction solution (A) | Kg/hr | 50 | 50 | 50 | 50 |
| | Temperature of heating medium | °C. | 230 | 230 | 230 | 230 |
| | Pressure | kPa | 0.3 | 0.3 | 1.1 | 0.8 |
| | Average residence time | min | 90 | 90 | 80 | 80 |
| | Outlet Temperature | °C. | 225 | 225 | 232 | 233 |
| | Melt viscosity (μ) | Pa·s | 3000 | 2700 | 3100 | 2600 |
| | Reduced viscosity (Q) | dL/g | 0.692 | 0.444 | 0.698 | 0.425 |
| | Amount of double bond terminal (Y) | mol/ton | 7.6 | 4.3 | 12.5 | 10.1 |
| | Q/P | — | 1.94 | 1.75 | 1.60 | 1.67 |
| | Y − X | mol/ton | 4.10 | 2.30 | 6.60 | 6.00 |
| | V/A | — | 5.0 | 5.0 | 5.0 | 5.0 |
| | Stirring shaft Rotation speed (ω) | rpm | 3 | 1.5 | 3 | 3 |
| | ωμ | — | 9000 | 4050 | 9300 | 7800 |
| Pelletization process | Number of stoppages of pelletization in 24 hours | times | 1 | 0 | 0 | 0 |
| Polycarbonate | Amount of all hydroxy terminal groups | mol/ton | 23 | 19 | 25 | 20 |
| | Content of monohydroxy compound | ppm | 440 | 460 | 1490 | 820 |
| | Reduced viscosity | dL/g | 0.688 | 0.448 | 0.685 | 0.434 |
| | Pellet YI | — | 9.2 | 8.1 | 15.6 | 19.2 |
| | Amount of extraneous matter | — | 146 | 119 | 155 | 160 |

*1: In Table-2, "DPC/dihydroxy compound" indicates the charge molar number of all dihydroxy compound based on DPC.
*2: In Table-2, "←" indicates that the value is the same as the value in the box to immediate left.

CONCLUSION

As seen in Table-2, when the reaction conditions of a penultimate reactor prior to the final polymerization reactor are appropriately set as specified in the production method of a polycarbonate of the present invention, the quality of the polycarbonate can be enhanced and at the same time, an advantage that the running is stabilized and the yield is increased, can be obtained. In special, in all of Examples 1 to 8, the pellet YI is low and the color tone is good as compared with Comparative Examples 1 and 2.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2011-079931) filed on Mar. 31, 2011, the entirety of which is incorporated herein by way of reference.

EXPLANATIONS OF REFERENCE SIGNS

1a: Raw material (carbonic acid diester) feed port
1b, 1c: Raw material (dihydroxy compound) feed port
1d: Catalyst feed port
2a: Raw material mixing tank
3a: Anchor-type stirring blade
4a: Raw material feed pump
4b, 4c, 4d: Gear pump
5a: Raw material filter
6a: First vertical stirring reactor
6b: Second vertical stirring reactor
6c: Third vertical stirring reactor
6d: Fourth horizontal stirring reactor
7a, 7b, 7c: MAXBLEND Blade
7d: Two-shaft spectacle-shaped stirring blade
8a, 8b: Internal heat exchanger
9a, 9b: Reflux condenser
10a, 10b: Reflux tube
11a, 11b, 11c, 11d: Distillation tube
12a, 12b, 12c, 12d: Condenser
13a, 13b, 13c, 13d: Decompressor
14a: Liquid distillate recovery tank
15a: Twin-screw extruder
15b: Polymer filter
16a: Strand cooling tank
16b: Strand cutter
16c: Pneumatic blower
16d: Product hopper
16e: Weigh scale
16f: Product bag (e.g., paper bag, flexible container)

The invention claimed is:

1. A method for producing a polycarbonate, the method comprising continuously feeding:
   dihydroxy compounds containing a specific dihydroxy compound comprising a moiety represented by formula (1):

$$-(CH_2-O)- \quad (1);$$

a carbonic acid diester; and
   a polymerization catalyst,
to a reactor and performing polycondensation to produce a polycarbonate,
   wherein:
      as the reactor, a plurality of reactors are connected at least in series;
      an internal temperature of a penultimate reactor prior to a final polymerization reactor is from 200° C. to less than 230° C.; and a melt viscosity of a reaction solution at an outlet of the penultimate reactor prior to the final polymerization reactor is from 100 to 1,000 Pa·s,
with the proviso that the moiety represented by formula (1) is not a part of —CH$_2$—OH.

2. The method according to claim 1, wherein the melt viscosity of the reaction solution at the outlet of the penultimate reactor prior to the final polymerization reactor is from 140 to 1,000 Pa·s.

3. The method according to claim 1, wherein the internal temperature of a penultimate reactor prior to the final polymerization reactor is from 200° C. to less than 225° C.

4. The method according to claim 1, wherein formula (2) is satisfied:

$$1.5 \leq Q/P \leq 2.5 \qquad (2),$$

wherein:
P represents a reduced viscosity of the reaction solution at the outlet of a penultimate reactor prior to the final polymerization reactor; and
Q represents a reduced viscosity of a reaction solution at the outlet of the final polymerization reactor.

5. The method according to claim 1, wherein formula (3) is satisfied:

$$Y-X \leq 6 \text{ and at the same time, } X \leq 5 \qquad (3),$$

wherein:
X (mol/ton) represents an amount of a double bond terminal structure in the reaction solution at the outlet of a penultimate reactor prior to the final polymerization reactor; and
Y (mol/ton) represents an amount of a double bond terminal structure in a reaction solution at the outlet of the final polymerization reactor.

6. The method according to claim 1, wherein:
the final polymerization reactor is a horizontal stirring reactor having inside thereof a plurality of horizontal rotating shafts; and
the reaction conditions satisfy formula (4):

$$500 \leq \omega \mu \leq 20,000 \qquad (4),$$

wherein:
ω represents a rotation speed (rpm) of a stirring blade; and
μ represents a melt viscosity (Pa·s) of a reaction solution at the outlet of the horizontal reactor.

7. The method according to claim 6, wherein the reaction conditions of the horizontal stirring reactor satisfy formula (5):

$$2 \leq V/A \leq 9 \qquad (5),$$

wherein:
V represents a volume (L) of the horizontal reactor; and
A represents a throughput (kg/hr) of a reaction solution.

8. The method according to claim 1, wherein a melt viscosity of a reaction solution at the outlet of the final polymerization reactor is from 1,800 to 3,500 Pa·s.

9. The method according to claim 1, wherein a temperature of a heating medium of the final polymerization reactor is from 210 to 260° C.

10. The method according to claim 1, wherein a charge molar ratio of the carbonic acid diester to all dihydroxy compounds when charged into a first reactor is from 0.990 to 1.030.

11. The method according to claim 1, wherein an amount of all hydroxy terminal groups in a reaction solution at the outlet of the final polymerization reactor is from 10 to 50 mol/ton.

12. The method according to claim 1, wherein an amount of a monohydroxy compound in a reaction solution at the outlet of a penultimate reactor prior to the final polymerization reactor is from 1,000 ppm to 3 wt % and the amount of a monohydroxy compound in a reaction solution at the outlet of the final polymerization reactor is from 1 to 700 ppm.

13. The method according to claim 1, wherein a pressure of the final polymerization reactor is from 10 Pa to 1 kPa.

14. The method according to claim 1, wherein the polymerization catalyst is a compound comprising at least one metal belonging to Group 2 of the long-form periodic table and lithium.

15. The method according to claim 1, wherein the specific dihydroxy compound is a compound having a cyclic ether structure.

16. The method according to claim 15, wherein the specific dihydroxy compound is a compound represented by formula (6):

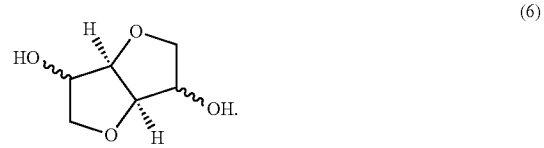

17. The method according to claim 1, further comprising filtering the polycarbonate obtained by the polycondensation by feeding the polycarbonate in the molten state without being solidified to a filter.

18. The method according to claim 1, further comprising ejecting the polycarbonate obtained by the polycondensation or a resin obtained by filtering the polycarbonate through a filter, into a strand from a die head and after cooling, pelletizing the strand with a cutter.

19. A polycarbonate pellet produced by the method according to claim 18.

20. The polycarbonate pellet according to claim 19, wherein a number of extraneous matters of 20 μm or more is 1,000 pieces/m$^2$ or less.

* * * * *